US006348535B1

(12) United States Patent
Sugimoto et al.

(10) Patent No.: US 6,348,535 B1
(45) Date of Patent: Feb. 19, 2002

(54) THERMOPLASTIC ELASTOMER COMPOSITION POWDER, POWDER MOLDING PROCESS WITH THE SAME, AND MOLDINGS

(75) Inventors: Hiroyuki Sugimoto, Funabashi; Yoshihiro Nakatsuji, Chiba, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/402,095

(22) PCT Filed: Jan. 26, 1999

(86) PCT No.: PCT/JP99/00279

§ 371 Date: Nov. 29, 1999

§ 102(e) Date: Nov. 29, 1999

(87) PCT Pub. No.: WO99/38912

PCT Pub. Date: Aug. 5, 1999

(30) Foreign Application Priority Data

Jan. 29, 1998 (JP) .......................................... 10-016788
Mar. 10, 1998 (JP) .......................................... 10-058679

(51) Int. Cl.[7] .......................... C08K 3/22; C08K 3/36; C08L 23/04; B32B 25/02

(52) U.S. Cl. ...................... 524/430; 524/444; 524/493; 524/515; 524/525; 521/140; 264/45.1; 264/241; 428/317.9; 428/318.8

(58) Field of Search ................................ 524/515, 525, 524/430, 444; 521/140; 264/45.1, 241; 428/317.9, 318.8

(56) References Cited

U.S. PATENT DOCUMENTS 5,308,699 A 5/1994 Hikasa et al.
5,308,700 A 5/1994 Hikasa et al.
5,532,055 A * 7/1996 Igarashi et al. .......... 428/318.6
5,585,431 A 12/1996 Igarashi et al.
5,840,229 A * 11/1998 Sugimoto et al. ........... 264/142

FOREIGN PATENT DOCUMENTS

| | | | |
|---|---|---|---|
| DE | 19757398 | | 6/1998 |
| EP | 0479580 | * | 4/1992 |
| EP | 479580 | | 4/1992 |
| EP | 0834533 | * | 1/1997 |
| EP | 1041111 | | 10/2000 |
| EP | 1043358 | | 10/2000 |
| JP | 7-82433 A | | 3/1995 |
| JP | 7082433 A | | 3/1995 |
| JP | 10-34681 A | | 2/1998 |
| JP | 10-81973 A | | 3/1998 |
| JP | 10-30036 A | | 9/1998 |
| JP | 10-231392 A | | 9/1998 |
| JP | 10-231393 A | | 9/1998 |
| WO | WO9700911 | | 1/1997 |
| WO | WO9733940 | | 9/1997 |

* cited by examiner

*Primary Examiner*—Tae H. Yoon

(57) ABSTRACT

A thermoplastic elastomer composition powder obtained by blending 0.1 to 5 parts by weight of (c) described below per 100 part by weight of a pulverized product of a thermoplastic elastomer composition comprising 10 to 250 parts by weight of (b) described below or 10 to 250 parts by weight of (b) and 0.01 to 10 parts by weight of (d) described below per 100 parts by weight of (a) described below, and having a complex dynamic viscosity $\eta^*$ (1) of $1.5\times10^5$ poise or less and a Newtonian viscosity index n of 0.67 or less, and a powder molding process and molded article using said powder, (a): a polyolefin-based resin, (b): a rubbery polymer imparting a new single tan δ peak at a temperature different from that of the tan δ peak of (a) and that of the tan δ peak of (b) within the range of −70 to 30° C. in a temperature dependence curve of tan δ determined by solid viscoelasticity measurement of the composition obtained by kneading with (a), and (c): a fine powder having a primary particle size of 300 nm or less.

20 Claims, 2 Drawing Sheets

THERMOPLASTIC ELASTOMER COMPOSITION POWDER, POWDER MOLDING PROCESS WITH THE SAME, AND MOLDINGS

This application is the national phase under 35 U.S.C. § 371 of PCT International Application No. PCT/JP99/00279 which has an International filing date of Jan. 26, 1999, which designated the United States of America.

1. Technical Field

The present invention relates to a thermoplastic elastomer composition powder, a powder molding process using said composition powder, and a molded article obtained by powder molding thereof. More specifically, the present invention relates to a thermoplastic elastomer composition powder obtained by blending a pulverized product of a thermoplastic elastomer composition containing a polyolefin-based resin and a rubbery polymer as essential components with a specific amount of a specific fine powder, wherein said composition powder is capable of producing a complicated shape molded article without causing underfill, pinholes, etc., excellent in powder flow property and provides a molded article which is hardly whitened on bending; a powder molding process using said powder; and a molded article obtained by using said powder.

2. Background Arts

Hitherto, a sheet-like molded article having a complicated uneven patterns such as leather grain, stitching and the like on its surface has been used as a skin material of automobile interior parts or the like.

As such molded articles, a molded article which is obtained by powder molding a powder obtained by pulverizing an olefin-based thermoplastic elastomer has been proposed as a substitute for the conventional molded article of a polyvinyl chloride-based resin (for example, refer to Japanese Patent Publication (Kokai) Nos. Hei 5-1183 and 5-5050). However, since the powder prepared by pulverizing such-thermoplastic elastomer had an insufficient powder flowability, it happened to cause problems that when a complicated shape molded article, for example, a molded article having a narrow and high convex part or the like is produced, underfill, pinholes and the like are generated.

Furthermore, in case of producing a molded article with a complicated shape, there have been problems that a molded article obtained by powder molding the powder prepared by pulverizing such thermoplastic elastomer, happens to be whitened on bending, and when said molded article is released from a mold or pre-formed into a predetermined shape before adhering said molded article on a substance material, the bent portion of said molded article tends to be whitened.

DISCLOSURE OF THE INVENTION

The objective of the present invention is to provide a thermoplastic elastomer composition powder obtained by blending a pulverized product of a thermoplastic elastomer composition containing a polyolefin-based resin and a rubbery polymer as essential components with a specific amount of a specific fine powder, wherein said composition powder is capable of producing a complicated shape molded article without causing underfill, pinholes, etc., excellent in powder flow property and provides a molded article which is hardly whitened on bending; a powder molding process using said powder; and a molded article obtained by using said powder.

Namely, the first invention of the present invention relates to a thermoplastic elastomer composition powder obtained by blending a thermoplastic elastomer composition comprising 10 to 250 parts by weight of (b) per 100 parts by weight of (a) described below, having a complex dynamic viscosity $\eta^*$ (1) of $1.5\times10^5$ poise or less and a Newtonian viscosity index n of 0.67 or less with 0.1 to 5 parts by weight of (c) described below per 100 parts by weight of a pulverized product of said thermoplastic elastomer composition.

(a): a polyolefin-based resin, (b): a rubbery polymer imparting a new single tan $\delta$ peak at a temperature different from that of the tan $\delta$ peak of (a) and that of the tan $\delta$ peak of (b) within the range of −70 to 30° C. in a temperature dependence curve of tan $\delta$ determined by solid viscoelasticity measurement of the composition obtained by kneading with (a), and (c): a fine powder having a primary particle diameter of 300 nm or less.

And, the second invention relates to a thermoplastic elastomer composition powder obtained by blending a pulverized product of a thermoplastic elastomer composition comprising a pigment (d) in addition to the fore-mentioned (a) and (b) with (c) described above. The solvent resistance of a molded article prepared by addition of the pigment (d) is improved.

Further, the third invention relates to a powder molding process using the thermoplastic elastomer composition powder of the fore-mentioned first invention or the fore-mentioned second invention.

Further, the fourth invention relates to a molded article obtained by powder molding the thermoplastic elastomer composition powder of the fore-mentioned first invention or the fore-mentioned second invention.

Figure 1:
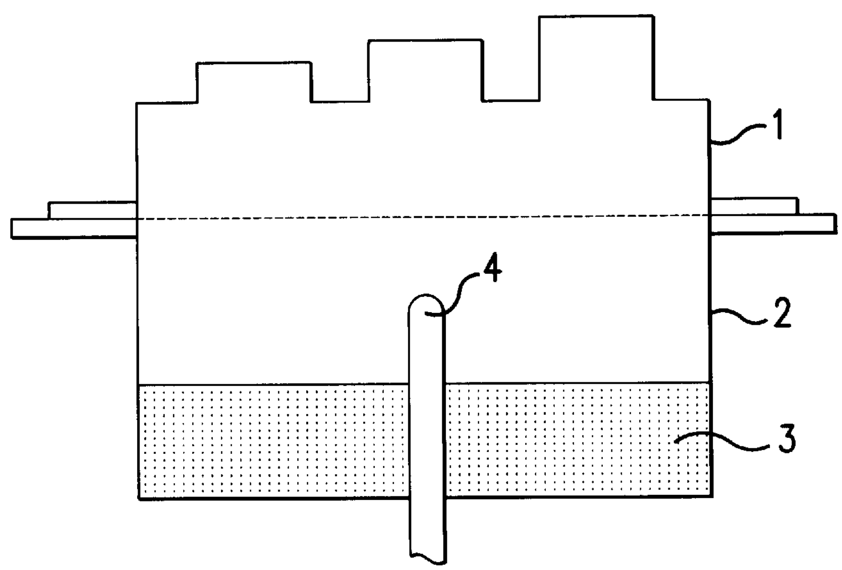
FIG. 1 is a cross-sectional conceptual drawing of a vessel in which the thermoplastic elastomer is charged and a mold for slush molding.

1.Mold for slush molding, 2. Vessel, 3. Thermoplastic elastomer powder, 4. Rotational axis, 5. Molded article, A. Protrusion of molded article, B. Protrusion of molded article, C. Protrusion of molded article.

BEST MODE FOR PRACTICING THE INVENTION

The component (a) used in the present invention is a polyolefin-based resin, and at least one selected from an olefin homopolymer or a copolymer of 2 or more olefins having a high crystallinity. Said olefins include usually ethylene and $\alpha$-olefins having 3 to 20 carbon atoms, and preferably ethylene and $\alpha$-olefins having 3 to 8 carbon atoms such as propylene, 1-butene, 1-hexene, 1-octene and the like. The crystallinity of said (a) is preferably 50% or more. Examples of said (a) include polyethylene, polypropylene, poly(butene-1), a copolymer of propylene and ethylene, a copolymer of propylene and $\alpha$-olefin other than propylene (for example, butene-1 and the like), and the like. When (a) is a propylene-ethylene copolymer or a propylene-1-butene copolymer, the thermoplastic elastomer composition of the present invention is more preferable from a viewpoint of providing a molded article with an excellent flexibility. In this case, the content of ethylene or an $\alpha$-olefin other than propylene is usually 25% by weight or less. When the content exceeds 25% by weight, the heat resistance of the molded article obtained may decrease.

Further, it is also possible to use a copolymer produced by copolymerizing two or more monomers selected from ethylene and said α-olefins at two or more stages. For example, it is possible to use a copolymer obtained by homopolymerizing propylene at the first stage and then copolymerizing propylene and ethylene, or propylene and α-olefin other than propylene at the second stage.

Further, the melt flow rate (MFR) of (a) measured at 230° C. under a load of 2.16 kgf according to JIS K-7210 is usually 20 to 500 g/10 min., preferably 50 to 300 g/10 min., and preferably 100 to 300 g/10 min in particular, from viewpoint of the strength of a molded article obtained by powder molding.

The component (b) used in the present invention is a rubbery polymer, and the rubbery polymer imparting a new single tan δ peak at a temperature different from the tan δ peak of (a) and the tan δ peak of (b), within a range of −70 to 30° C. in a temperature dependence curve of tan δ determined by solid dynamic viscoelasticity measurement of the composition obtained by kneading the rubbery polymer with (a).

As (b), a conjugated diene-based rubbery polymer, a hydrogenated conjugated diene-based rubbery polymer as a hydrogenated product thereof, an ethylene-α-olefin-based copolymer containing ethylene units and α-olefin units having 4 to 20 carbon atoms and having a content of the α-olefin unit of 50% by weight or more, a propylene-butene-based copolymer having specific properties, a propylene-α-olefin-ethylene-based copolymer having a specific properties, and the like are mentioned.

The conjugated diene-based rubbery polymer used as (b) is a conjugated diene polymer rubber or a conjugated diene-based copolymer rubber.

The conjugated diene polymer rubber is a polymer rubber prepared by homo polymerizing or copolymerizing at least one conjugated diene. Examples of the conjugated diene include conjugated dienes having 4 to 8 carbon atoms such as butadiene, isoprene, 1,3-pentadiene, 2,3-dimethyl butadiene and the like.

Examples of the conjugated diene polymer rubber include polybutadiene, polyisoprene, polypentadiene, a butadiene-isoprene copolymer and the like. The conjugated diene-based copolymer rubber is a copolymer rubber of the same conjugated diene as that described above and a monomer other than said conjugated diene. Examples of the monomer other than the conjugated diene include a vinyl aromatic compound, a vinyl ester compound, an ethylenically unsaturated carboxylic acid ester compound, a vinyl nitrile compound and the like. Among them, a vinyl aromatic compound is preferable.

The 1- or 2-position of a vinyl group of the vinyl aromatic compound may be substituted with an alkyl group such as a methyl group or the like, etc. Examples of the vinyl aromatic compound include vinyl aromatic compounds having 8 to 12 carbon atoms such as styrene, p-methylstyrene, α-methylstyrene and the like. As the vinyl ester compound, vinyl acetate and the like are exemplified. As the ethylenically unsaturated carboxylic acid ester compound, methyl methacrylate, ethyl methacrylate, methyl acrylate, butyl acrylate and the like are exemplified. As the vinyl nitrile compound, acrylonitrile, methacrylonitrile and the like are exemplified.

Examples of the conjugated diene copolymer rubber include conjugated diene-vinyl aromatic compound copolymer rubbers such as a butadiene-styrene copolymer rubber, an isoprene-styrene copolymer rubber, a butadiene-p-methylstyrene copolymer rubber and the like; conjugated diene-vinyl ester compound copolymer rubbers such as a butadiene-vinyl acetate copolymer rubber and the like; conjugated diene-ethylenically unsaturated carboxylic acid ester copolymer rubbers such as a butadiene-methacrylic acid copolymer rubber, a butadiene-methyl acrylate copolymer and the like; conjugated diene-vinyl nitrile compound copolymer rubbers such as a butadiene-acrylonitrile copolymer and the like, etc.

The hydrogenated conjugated diene-based rubber includes a hydrogenated conjugated diene polymer rubber or a hydrogenated conjugated diene copolymer rubber prepared by hydrogenating the above-mentioned conjugated diene polymer rubber or conjugated diene-based copolymer rubber, respectively, and examples of the hydrogenated conjugated diene-based rubber include hydrogenated products of the above-mentioned conjugated diene-based rubbers.

Such conjugated diene-based copolymer rubber or hydrogenated conjugated diene-based rubber can be easily produced by methods described in, for example, Japanese Patent Publication (Kokai) Nos. Hei 2-36244, Hei 3-72512, Hei 7-118335, Sho 56-38338, Sho 61-60739, and the like. Further, in the conjugated diene-based copolymer rubber or hydrogenated conjugated diene-based copolymer rubber, the content of the monomer unit other than the conjugated diene is usually 50% by weight or less, and preferably 20% by weight or less because a molded article having an excellent flexibility is obtained. When the content exceeds 50% by weight, a molded article prepared by molding the thermoplastic elastomer composition tends to be whitened when being bent.

When the hydrogenated conjugated diene-based rubber is used as (b), the ratio of the number of hydrogenated conjugated diene units having a side chain with at least two carbon atoms to the total number of hydrogenated conjugated diene units is usually 50% or more, preferably 60 to 95%, and more preferably from 70 to 90%, depending on the kind of the conjugated diene monomer used at polymerization. Such ratio can be determined by $^{1}$H-NMR measurement.

The MFR of the conjugated diene-based polymer or hydrogenated product thereof is preferably 2 to 200 g/10 min., more preferably 5 to 100 g/10 min. and preferably 10 to 100 g/10 min. in particular, because a molded article excellent in appearance and strength can be obtained by powder molding.

As (b), the ethylene-α-olefin-based copolymer rubber containing ethylene units and α-olefin units having 4 to 20 carbon atoms and having an α-olefin unit content of 50% by weight or more can be also used. As the α-olefin, α-olefins having 4 to 8 carbon atoms such as 1-butene, 1-hexene, 1-octene and the like are preferably used. Further, monomers such as non-conjugated dienes such as 1,4-hexadiene, 1,6-octadiene, dicyclopentadiene, 2-methyl-2,5-norbornadiene, 5-ethylidene-2-norbornene or the like, and vinyl aromatic compounds such as styrene, α-methylstyrene, 2,4-dimethylstyrene, p-methylstyrene or the like, etc. may be copolymerized in said ethylene-α-olefin-based copolymer rubber.

The content of the α-olefin unit in said ethylene-α-olefin-based copolymer rubber is preferably 50 to 90% by weight, and more preferably 60 to 90% by weight. The content of said α-olefin unit can be determined from the absorption of a peak (e.g., a symmetrical bending vibration peak of the terminal methyl group of a short chain branch, or a rocking vibration peak of a methylene group in a branch) derived from an α-olefin unit which is determined by infrared absorption spectroscopy. The content of the α-olefin unit is described in documents, for example, "Polymer Analysis Handbook, Chapter 2, Section 2.2 (pages 587–591) in 1995, edited by Japan Analytical Chemistry Society and published by KINOKUNIYA Co.,Ltd." and "Kagaku no Ryouiki; A Special Number 140, IR, Raman and Vibration [II]: Status Quo and Future Forecast, "Characterization of Polyethylene by Infrared absorption" (pages 73–81) in 1983, edited by Naomichi Tsuboi et al and published by Nankou-do Co.".

The above-mentioned ethylene-α-olefin-based copolymer rubber can be obtained by polymerization using a metal complex as an initiator (main catalyst) in the presence of a co-catalyst which is disclosed in, for example, Japanese Patent Publications (Kokai) Nos. Hei 3-163088, Hei 5-194641, etc.

Examples of said metal complex (main catalyst) include zirconium complexes such as (tert-butylamido)dimethyl($\eta^5$-cyclopentadienyl) silanezirconium dichloride, etc., and titanium complexes such as (tert-butylamido)dimethyl (tetramethyl-$\eta^5$-cyclopentadienyl)silanetitanium dichloride, (anilido)(dimethyl)(tetramethyl-$\eta^5$-cyclopentadienyl) silanetitanium dichloride, etc. These complexes can be used by being supported on a carrier such as alumina, magnesium dichloride, silica, etc.

Examples of the co-catalyst include aluminum compounds such as methylaluminoxane, aluminum hydride, alkylaluminum halides, trialkylaluminums, etc., and Lewis acids containing boron such as tris(pentafluorophenyl) borane, triphenylcarbeniumtetrakis(pentafluorophenyl) borane, etc. As the co-catalyst, one compound can be used and 2 or more compounds can be used in combination. The production of the ethylene-α-olefin-based copolymer rubber using the above-mentioned catalyst system, namely, polymerization is usually carried out in a solvent. As the solvent, a hydrocarbon solvent such as, for example, hexane, heptane, toluene, ethylbenzene, xylene or the like is used. The polymerization is carried out in an inert gas atmosphere such as, for example, nitrogen, argon, hydrogen or the like. The polymerization temperature is usually −30° C. to 250° C. The MFR of such ethylene-α-olefin-based copolymer rubber is preferably 2 to 200 g/10 min., more preferably 5 to 100 g/10 min. and preferably 10 to 100 g/10 min. in particular, because a molded article excellent in appearance and strength can be obtained by powder molding.

And, as the component(b), a propylene-butene-based copolymer having a Shore A hardness measured according to ASTM D-2240 of 70 or less and an intrinsic viscosity [η] measured at 70° C. inxylene solvent of 0.3 dl/g or more, and a propylene-α-olefin-ethylene-based copolymer containing propylene units, α-olefins units having 4 to 20 carbon atoms and ethylene units, which has a Shore A hardness measured according to ASTM D-2240 of 70 or less and an intrinsic viscosity [η] measured at 70° C. in xylene solvent of 0.3 dl/g or more, can be used. Although it is necessary that the Shore A hardness measured according to ASTM D-2240 of the propylene-butene-based copolymer or the propylene-α-olefin-ethylene-based copolymer is 70 or less, 60 or less and further 50 or less are preferable. When the hardness exceeds 70, the flexibility of the molded article prepared by powder molding the olefin-based thermoplastic elastomer composition powder of the present invention tends to be inferior.

It is necessary that the intrinsic viscosity [η] measured at 70° C. in xylene solvent of the propylene-butene-based copolymer and the propylene-α-olefin-ethylene-based copolymer is 0.3 dl/g or more, and 0.5 dl/g or more is preferable. When said intrinsic viscosity is too low, the mechanical properties such as tensile strength, elongation at break, etc. of the molded article prepared by powder molding the thermoplastic elastomer composition powder of the present invention tend to be inferior. Further, the intrinsic viscosity [η] is determined according to the equation (1) described below, by measuring the viscosity at 70° C. of xylene solution of said propylene-butene-based copolymer and the propylene-α-olefin-ethylene-based copolymer at various concentrations with a Ubbelohde viscometer.

$$[\eta]=\lim_{c\to 0} (\eta_{sp}/C) \quad (1)$$

Wherein $\eta_{sp}$ is a specific viscosity of solution, and C is a mass concentration of solution. Further, the specific viscosity of solution is determined according to the equation (2) described below.

$$\eta_{sp}=(\eta/\eta_0)-1 \quad (2)$$

$\eta$ and $\eta_0$ are a viscosity of solution and a viscosity of solvent, respectively.

Such propylene-butene-based copolymer and propylene-α-olefin-ethylene-based copolymer which have neither crystal-melting peak nor crystallization peak when measured with a differential scanning calorimeter (DSC), are preferable. When they do not satisfy these conditions, the flexibility of the molded article prepared by powder molding the olefin-based thermoplastic elastomer composition powder may be inferior.

The value (a value obtained by dividing a weight average molecular weight by a number average molecular weight) indicating the molecular weight distribution of such propylene-butene-based copolymer or propylene-α-olefin-ethylene-based copolymer is preferably 3 or less and more preferably 2.5 or less. When said value exceeds 3 (the molecular weight distribution is broad), the molded article prepared by powder molding the olefin-based thermoplastic elastomer composition powder may result to sticky touch. For example, the molecular weight distribution can be measured according to GPC method (Gel Permeation Chromatography). The content of 1-butene in the propylene-1-butene-based copolymer is preferably 0.5 to 90% by mole and more preferably 1 to 70% by mole. When said content is too little, the flexibility of the molded article prepared by powder molding the olefin-based thermoplastic elastomer composition powder of the present invention may be inferior, and on the other hand, when said content is too much, the scratch resistance of said molded article may be inferior.

The content of propylene unit and the content of α-olefin unit in the propylene-α-olefin-ethylene-based copolymer preferably has the relation below:

$y/(100-x)\geqq 0.3$, more preferably $y/(100-x)\geqq 0.4$, and further preferably $y/(100-x)\geqq 0.5$.

The flexibility of the molded article prepared by powder molding the olefin-based thermoplastic elastomer composition powder of the present invention may be inferior in case of deviating said range. Further, in the above equation, x represents a molar content of propylene unit in the copolymer, and y indicates a molar content of α-olefin unit having 4 to 20 carbon atoms in the copolymer.

The content of propylene in the propylene-α-olefin-ethylene-based copolymer is preferably 90% or less, more preferably 80% or less, further preferably 70% or less, preferably 60% or less in particular, and most preferably 50% or less in case of requiring low temperature impact resistance in particular. The olefin-based thermoplastic elastomer composition may be inferior in low temperature impact resistance in case out of said range.

Further, non-conjugated dienes such as 1,4-hexadiene, 1,6-octadiene, cyclopentadiene, 2-methyl-2,5-norbornadiene, 5-ethylidene-2-norbornene, etc., and vinyl aromatic compounds such as styrene, α-methylstyrene, 2,4-dimethylstyrene p-methylstyrene, etc. may be copolymerized in said propylene-butene-based copolymer and propylene-α-olefin-ethylene -based copolymer, so far as not damaging the objective of the present invention.

The configuration of the side chains of propylene and/or 1-butene in the propylene-butene-based copolymer and the configuration of the side chains of propylene unit and/or α-olefin unit in propylene-α-olefin-ethylene-based copolymer are preferably atactic structures. Said configuration being the atactic structure indicates a case that the configuration of the side chains of propylene sequences in the copolymer is an atactic structure, a case that the configuration of the side chains of 1-butene or α-olefin sequences in the copolymer is an atactic structure, or a case that the configuration of the side chains of propylene-1-butene sequences in the copolymer or propylene-α-olefin sequences in the copolymer is an atactic structure. The atactic structure is identified, for example, by that when propylene is homopolymerized using the catalyst system used for polymerization of the propylene-1-butene-based copolymer and the propylene-α-olefin-ethylene-based copolymer, the obtained polymer has a structure in which the value of F(1) defined by the equation described below is 40 or more and 60 or less, preferably 43 or more and 57 or less, and more preferably 45 or more and 55 or less, using [mm], [mr] and [rr] of the respective signal intensities attributed to mm, mr and rr of the methyl carbon of propylene which can be determined by $^{13}$CNMR.

$F(1)=100\times[mr]/([mm]+[mr]+[rr])$ At the same time, concerning said propylene-1-butene-based copolymer and propylene-α-olefine-thylene-based copolymer, the a tactic structure is identified by that the value corresponding to F(1) determined by using the respective signal intensities attributed to mm's, mr's and rr's of the methyl carbon of propylene, the branched methylene carbon of 1-butene, the branched terminal methyl carbon of 1-butene, and the like is within the above-mentioned range.

When said propylene-butene-1-based copolymer and propylene-α-olefin-ethylene-based copolymer have not the atactic structure, the hardness becomes high and the flexibility of the molded article prepared by using the thermoplastic elastomer composition powder may be inferior. Further, the attribution of signals of mm's, mr's and rr's of the methyl carbon derived from propylene, the branched methylene carbon derived from 1-butene unit or α-olefin unit, the branched terminal methyl carbon of 1-butene unit or α-olefin unit, and the like can be referred to, for example, “Macro molecules Vol.24(1991), page 2334, by T.Asakura” and “New Edition of Polymer Analysis Handbook (1995) issued by KINOKUNIYA Co., Ltd.”.

Said propylene-butene-1-based copolymer and propylene-α-olefin-ethylene-based copolymer can be preferably produced in the presence of an olefin polymerization catalyst obtained by using (A) described below, and (B) described below and/or (C) described below:

(A): a transition metal complex represented by the following general formula [I]:

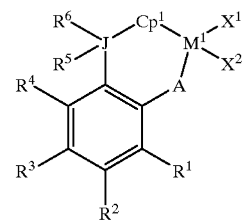

(wherein $M^1$ represents a transition metal atom of the Group IV of the Periodic Table of the Elements; A represents an atom of the Group XVI of the Periodic Table of the Elements; J represents an atom of the Group XIV of the Periodic Table of the Elements; $Cp^1$ represents a group having a cyclopentadiene type anion skeleton; each of $X^1$, $X^2$, $R^1$, $R^2$, $R^3$, $R^4$, $R^5$ and $R^6$ independently represents a hydrogen atom, a halogen atom, an alkyl group, an aralkyl group, an aryl group, a substituted silyl group, an alkoxy group, an aralkyloxy group, an aryloxy group or a disubstituted amino group; and $R^1$, $R^2$, $R^3$, $R^4$, $R^5$ and $R^6$ may be optionally combined with each other to form a ring);

(B): at least one aluminum compound selected from the following (B1) to (B3)

(B1) an organo aluminum compound represented by the general formula $E^1{}_dAlZ_{3-d}$, (B2) a cyclic aluminoxane having a structure represented by the general formula $\{—Al(E^2)—O—\}_e$, and (B3) a linear aluminoxane having a structure represented by the general formula $E^3\{—Al(E^3)—O—\}_fAlE^3{}_2$ (wherein $E^1$, $E^2$and $E^3$respectively represent a hydrocarbon group, all of $E^1$, $E^2$ and $E^3$ may be the same or different; Z represents a hydrogen atom or a halogen atom, and all of Z may be the same or different; d represents a numeral of 0 to 3; e represents an integer of not less than 2; and f represents an integer of not less than 1); and (C): a boron compound of any one of the following (C1) to (C3);

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L\text{-}H)^+(BQ^1Q^2Q^3Q^4)^-$ (wherein B represents a boron atom in the trivalent valence state; $Q^1$ to $Q^4$ may be the same or different and represent a halogen atom, a hydrocarbon group, a halogenated hydrocarbon group, a substituted silyl group, an alkoxy group or a di-substituted amino group, and they are the same or different; G+ represents an inorganic or organic cation; L represents a neutral Lewis base; and (L-H)+ represents a Brfnsted acid).

(A) Transition metal compound

In the general formula [I], the transition metal atom represented by $M^1$ indicates a transition metal element of the Group IV of the Periodic Table of the Elements (IUPAC Inorganic Chemistry Nomenclature, Revised Edition, 1989), and examples thereof include titanium atom, zirconium atom, hafnium atom, etc. Among them, titanium atom or zirconium atom is preferred.

In the general formula [I], the atom of the Group XVI of the Periodic Table of the Elements atom represented by A includes an oxygen atom, a sulfur atom, a selenium atom, etc., and an oxygen atom is preferred.

In the general formula [I], the atom of the Group XIV of the Periodic Table of the Elements atom represented by A includes a carbon atom, a silicon atom, a germanium atom, etc., and a carbon atom or a silicon atom is preferred.

The group having a cyclopentadiene anion skeleton, as for the substituent $Cp^1$, includes $\eta^5$-(substituted) cyclopentadienyl group, $\eta^5$-(substituted)indenyl group, $\eta^5$-(substituted) fluorenyl group, etc. Specific examples thereof include $\eta^5$-cyclopentadienyl group, $\eta^5$-methyl cyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group,$\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group or $\eta^5$-fluorenyl group is preferred.

Examples of the halogen atom in the substituent $X^1$, $X^2$, $R^1$, $R^2$, $R^3$, $R^4$, $R^5$ or $R^6$ include fluorine atom, chlorine atom, bromine atom and iodine atom, preferably chlorine atom or bromine atom, more preferably chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include, for example, methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., more preferably methyl group, ethyl group, isopropyl group, tert-butyl group or amyl group.

All of these alkyl groups may be substituted with a halogen atom (fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-decylphenyl)methyl group, (n-tetradecylphenyl)methyl group, naphthylmethyl group, anthracenylmethyl group, etc., more preferably benzyl group.

All of these aralkyl groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is preferred. Examples thereof include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group.

All of these aryl groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as phenyl group. Examples of the substituted silyl group having 1 to 20 carbon atoms include mono-substituted silyl group having 1 to 20 carbon atoms, such as methylsilyl group, ethylsilyl group, phenylsilyl group, etc.; di-substituted silyl group having 2 to 20 carbon atoms, such as dimethylsilyl group, diethylsilyl group, diphenylsilyl group, etc.; and tri-substituted silyl group having 3 to 20 carbon atoms, such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenylmethoxy group, etc., more preferably benzyloxy group.

All of these aralkyloxy groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (fluorine atom, chlorine atom, bromine atom or iodine atom), an alkoxy group such as methoxy group, ethoxy group, etc., an aryloxy group such as phenoxy group, etc. or an aralkyloxy group such as benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc.; aryl group having 6 to 10 carbon atoms, such as phenyl group, etc.; and aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group.

The substituent $R^1$, $R^2$, $R^3$, $R^4$, $R^5$ and $R^6$maybe optionally combined with each other to form a ring.

$R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably halogen atom.

Examples of the compound A represented by the formula [I] (hereinafter referred to as a "transition metal complex A", sometimes) include transition metal complex wherein J is a carbon atom in the general formula [I], such as methylene (cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy) titanium dichloride, methylene (cyclopentadienyl)(3-tert-butyl-5-methoxy-2-phenoxy) titanium dichloride, methylene(cyclopentadienyl)(3-tert-butyl-5-chloro-2-phenoxy)titanium dichloride, methylene (methylcyclopentadienyl)(3,5-dimethyl-2-phenoxy) titanium dichloride, methylene(methylcyclopentadienyl)(3-tert-butyl-2-phenoxy)titanium dichloride, methylene (methylcyclopentadienyl)(3-tert-butyl-5-methyl-2-phenoxy)titanium dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methyl cyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl) (3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy) titanium dichloride, methylene(tert-butylcyclopentadienyl) (3-tert-butyl-5-chloro-2-phenoxy)titanium dichloride, methylene(tetramethylcyclopentadienyl)(3,5-dimethyl-2-phenoxy)titanium dichloride, methylene (tetramethylcyclopentadienyl)(3-tert-butyl-2-phenoxy) titanium dichloride, methylene (tetramethylcyclopentadienyl)(3-tert-butyl-5-methyl-2-phenoxy)titanium dichloride, methylene (tetramethylcyclopentadienyl)(3-phenyl-2-phenoxy) titanium dichloride, methylene (tetramethylcyclopentadienyl)(3-tert-butyldimethylsilyl-5-methyl-2-phenoxy)titanium dichloride, methylene (tetramethylcyclopentadienyl)(3-trimethylsilyl-5-methyl-2-phenoxy)titanium dichloride, methylene (tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl)(3-tert-butyl-2-phenoxy) titanium dichloride, methylene (trimethylsilylcyclopentadienyl)(3-tert-butyl-5-methyl-2-phenoxy)titanium dichloride, methylene (trimethylsilylcyclopentadienyl)(3-phenyl-2-phenoxy) titanium dichloride, methylene (trimethylsilylcyclopentadienyl)(3-tert-butyldimethylsilyl-5-methyl-2-phenoxy)titanium dichloride, methylene (trimethylsilylcyclopentadienyl)(3-trimethylsilyl-5-methyl-2-phenoxy)titanium dichloride, methylene (trimethylsilylcyclopentadienyl)(3-tert-butyl-5-methoxy-2-phenoxy)titanium dichloride, methylene (trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene (fluorenyl)(3-tert-butyl-2-phenoxy)titanium dichloride, methylene(fluorenyl)(3-tert-butyl-5-methyl-2-phenoxy) titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene (fluorenyl)(3-tert-butyl-5-chloro-2-phenoxy)titanium dichloride, isopropylidene(cyclopentadienyl)(3,5-dimethyl-2-phenoxy)titanium dichloride, isopropylidene (cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene (cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene (cyclopentadienyl)(3-tert-butyl-5-chloro-2-phenoxy) titanium dichloride, isopropylidene(methyl cyclopentadienyl)(3,5-dimethyl-2-phenoxy)titanium dichloride, isopropylidene(methyl cyclopentadienyl)(3-tert-butyl-2-phenoxy)titanium dichloride, isopropylidene (methyl cyclopentadienyl)(3-tert-butyl-5-methyl-2-phenoxy)titanium dichloride, isopropylidene(methyl cyclopentadienyl)(3-phenyl-2-phenoxy)titanium dichloride, isopropylidene(methyl cyclopentadienyl)(3-tert-butyldimethylsilyl-5-methyl-2-phenoxy)titanium dichloride, isopropylidene(methyl cyclopentadienyl)(3-trimethylsilyl-5-methyl-2-phenoxy) titanium dichloride, isopropylidene(methyl cyclopentadienyl)(3-tert-butyl-5-methoxy-2-phenoxy)titanium dichloride, isopropylidene (methyl cyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tertbutylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene (tert-butylcyclopentadienyl)(3-tert-butyl-5-chloro-2- phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene (fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene (fluorenyl)(3-tert-butyldimethylsilyl-5-methyl-2-phenoxy) titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene (cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy) titanium dichloride, diphenylmethylene(cyclopentadienyl) (3-tert-butyldimethylsilyl-5-methyl-2-phenoxy)titanium dichloride, diphenylmethylene(cyclopentadienyl)(3-trimethylsilyl-5-methyl-2-phenoxy) titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene (methylcyclopentadienyl)(3,5-dimethyl-2-phenoxy) titanium dichloride, diphenylmethylene (methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene (methylcyclopentadienyl)(3-tert-butyldimethylsilyl-5-methyl-2-phenoxy)titanium dichloride, diphenylmethylene (methylcyclopentadienyl)(3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy) titanium dichloride, diphenylmethylene(tert-butylcyclopentadienyl)(3,5-dimethyl-2-phenoxy)titanium dichloride, diphenylmethylene(tert-butylcyclopentadienyl) (3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene (tertbutylcyclopentadienyl)(3-trimethylsilyl-5-methyl-2-phenoxy)titanium dichloride, diphenylmethylene (tertbutylcyclopentadienyl)(3-tert-butyl-5-methoxy-2-phenoxy)titanium dichloride, diphenylmethylene (tertbutylcyclopentadienyl)(3-tert-butyl-5-chloro-2-phenoxy)titanium dichloride, diphenylmethylene (tetramethylcyclopentadienyl)(3,5-dimethyl-2-phenoxy) titanium dichloride, diphenylmethylene (tetramethylcyclopentadienyl)(3-tert-butyl-2-phenoxy) titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy) titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium dichloride, diphenylmethylene (tetramethylcyclopentadienyl)(3-tert-butyl-5-chloro-2-phenoxy)titanium dichloride, diphenylmethylene (trimethylsilylcyclopentadienyl)(3,5-dimethyl-2-phenoxy) titanium dichloride, diphenylmethylene (trimethylsilylcyclopentadienyl)(3-tert-butyl-2-phenoxy) titanium dichloride, diphenylmethylene (trimethylsilylcyclopentadienyl)(3-tert-butyl-5-methyl-2-phenoxy)titanium dichloride, diphenylmethylene (trimethylsilylcyclopentadienyl)(3-phenyl-2-phenoxy) titanium dichloride, diphenylmethylene (trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy) titanium dichloride, diphenylmethylene(fluorenyl)(3-tert-butyl-2-phenoxy)titanium dichloride, diphenylmethylene (fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl) (3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl) (3-tert-butyl-5-chloro-2-phenoxy)titanium dichloride, compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complex wherein J is an atom of Group XIV of the Periodic Table of the Elements other than carbon atom, such as dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl(cyclopentadienyl)(3-tert-butyl-5-methyl-2-phenoxy)titanium dichloride, dimethylsilyl(cyclopentadienyl)(3,5-di-tert-butyl-2-phenoxy)titanium dichloride, dimethylsilyl(cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy)titanium dichloride, dimethylsilyl(methyl cyclopentadienyl)(2-phenoxy)titanium dichloride, dimethylsilyl(methyl cyclopentadienyl)(3-methyl-2-phenoxy)titanium dichloride, dimethylsilyl(methyl cyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride, dimethylsilyl(methylcyclopentadienyl)(3,5-diamyl-2-phenoxy)titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy)titanium dichloride, dimethylsilyl(n-butylcyclopentadienyl)( 3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy)titanium dichloride, dimethylsilyl(tert-butylcyclopentadienyl)(5-methyl-3-phenyl-2-phenoxy)titanium dichloride, dimethylsilyl(tert-butylcyclopentadienyl)( 3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy)titanium dichloride, dimethylsilyl(tert-butylcyclopentadienyl)(3-tert-butyl-5-chloro-2-phenoxy)titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl(tetramethylcyclopentadienyl)(3-methyl-2-phenoxy)titanium dichloride, dimethylsilyl(tetramethylcyclopentadienyl)(3,5-dimethyl-2-phenoxy)titanium dichloride, dimethylsilyl(tetramethylcyclopentadienyl)(3-tert-butyl-2-phenoxy)titanium dichloride, dimethylsilyl(tetramethylcyclopentadienyl)(3-tert-butyl-5-methyl-2-phenoxy)titanium dichloride, dimethylsilyl(tetramethylcyclopentadienyl)(3,5-di-tert-butyl-2-phenoxy)titanium dichloride, dimethylsilyl(tetramethylcyclopentadienyl)(5-methyl-3-phenyl-2-phenoxy)titanium dichloride, dimethylsilyl(tetramethylcyclopentadienyl)(3-tert-butyldimethylsilyl-5-methyl-2-phenoxy)titanium dichloride, dimethylsilyl(tetramethylcyclopentadienyl)(5-methyl-3-trimethylsilyl-2-phenoxy)titanium dichloride, dimethylsilyl(tetramethylcyclopentadienyl)(3-tert-butyl-5-methoxy-2-phenoxy)titanium dichloride, dimethylsilyl(tetramethylcyclopentadienyl)(3-tert-butyl-5-chloro-2-phenoxy)titanium dichloride, dimethylsilyl(tetramethylcyclopentadienyl)(3,5-diamyl-2-phenoxy)titanium dichloride, dimethylsilyl(trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl(trimethylsilylcyclopentadienyl)(3,5-dimethyl-2-phenoxy)titanium dichloride, dimethylsilyl(trimethylsilylcyclopentadienyl)(3-tert-butyl-2-phenoxy)titanium dichloride, dimethylsilyl(trimethylsilylcyclopentadienyl)(3-tert-butyl-5-methyl-2-phenoxy)titanium dichloride, dimethylsilyl(trimethylsilylcyclopentadienyl)(3,5-di-tert-butyl-2-phenoxy)titanium dichloride, dimethylsilyl(trimethylsilylcyclopentadienyl)(5-methyl-3-phenyl-2-phenoxy)titanium dichloride, dimethylsilyl(trimethylsilylcyclopentadienyl)(3-tert-butyldimethylsilyl-5-methyl-2-phenoxy)titanium dichloride, dimethylsilyl(trimethylsilylcyclopentadienyl)(5-methyl-3-trimethylsilyl-2-phenoxy)titanium dichloride, dimethylsilyl (trimethylsilylcyclopentadienyl)(3-tert-butyl-5-methoxy-2-phenoxy)titanium dichloride, dimethylsilyl(trimethylsilylcyclopentadienyl)(3-tert-butyl-5-chloro-2-phenoxy)titanium dichloride, dimethylsilyl(trimethylsilylcyclopentadienyl)(3,5-diamyl-2-phenoxy)titanium dichloride, dimethylsilyl(indenyl)(2-phenoxy)titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy)titanium dichloride, dimethylsilyl(indenyl)(3,5-di-tert-butyl-2-phenoxy)titanium dichloride, dimethylsilyl(indenyl)(5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy)titanium dichloride, dimethylsilyl(indenyl)(3-tert-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl(fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethylcyclopentadienyl)(1-naphthox-2-yl)titanium dichloride, compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl), compounds wherein (2-phenoxy) of these compounds is replaced by (3-phenyl-2-phenoxy), (3-trimethylsilyl-2-phenoxy) or (3-tert-butyldimethylsilyl-2-phenoxy), compounds wherein dimethylsilyl of these compounds is replaced by diethylsilyl, diphenylsilyl or dimethoxysilyl, compounds wherein titanium of these compounds is replaced by zirconium or hafnium, and compound wherein dichloride of these compounds is replaced by dibromide, diiodide, bis(dimethylamide), bis(diethylamide), di-n-butoxide or diisopropoxide.

The transition metal complex represented by the above general formula [I] can be synthesized, for example, by the following method.

That is, a compound having a structure that a group having a cyclopentadienyl skeleton and a group having an alkoxybenzene skeleton are combined via an atom of Group XIV is obtained by reacting an alkoxybenzene compound whose ortho-position is halogenated with a cyclopentadiene compound substituted with a halogenated atom of Group XIV in the presence of an organoalkalinemetal or a metallic magnesium. Then, a transition metal complex represented by the above general formula [I] can be synthesized by treating the compound with a base, and reacting with a transition metal halide, a transition metal hydrocarbon compound or transition metal hydrocarbonoxy compound.

(B) Aluminum compound

The aluminum compound (B) used in the present invention includes publicly known organoaluminum compounds, that is, one or more aluminum compounds selected from (B1) an organoaluminum compound represented by the general formula $E^1_aAlZ_{3-a}$, (B2) a cyclic aluminoxane having a structure represented by the general formula $\{—Al(E^2)—O—\}_b$ and (B3) a linear aluminoxane having a structure represented by the general formula $E^3\{—Al(E^3)—O—\}_cAlE^3_2$ (wherein $E^1$, $E^2$ and $E^3$ respectively represents a hydrocarbon group, all of $E^1$, $E^2$ and $E^3$ may be the same or different; Z represents a hydrogen atom or a halogen atom, and all of Z may be the same or different; a represents a numeral satisfying $0<a\leqq 3$; b represents an integer of not less than 2; and c represents an integer of not less than 1). As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1_aAlZ_{3-a}$ include trialkylaluminums such as trimethylaluminum, triethylaluminum, tripropylaluminum, triisobutylaluminum, trihexylaluminum, etc.; dialkylaluminum chlorides such as dimethylaluminum chloride, diethylaluminum chloride, dipropylaluminum chloride, diisobutylaluminum chloride, dihexylaluminum chloride, etc.; alkylaluminum dichlorides such as methylaluminum dichloride, ethylaluminum dichloride, propylaluminumdichloride, isobutylaluminumdichloride, hexylaluminum dichloride, etc.; and dialkylaluminum hydrides such as dimethylaluminum hydride, diethylaluminum hydride, dipropylaluminum hydride, diisobutylaluminum hydride, dihexylaluminum hydride, etc.

Among them, trialkylaluminum is preferred and triethylaluminum or triisobutylaluminum is more preferred.

Specific examples of $E^2$ and $E^3$ in (B2) a cyclic aluminoxane having a structure represented by the general formula $\{—Al(E^2)—O—\}_b$ and (B3) a linear aluminoxane having a structure represented by the general formula $E^3—\{Al(E^3)—O—\}_cAlE^3_2$ include alkyl group such as methyl group, ethyl group, n-propyl group, isopropyl group, n-butyl group, isobutyl group, n-pentyl group, neopentyl group, etc. b is an integer of not less than 2, c is an integer of not less than 1. Each of $E^2$ and $E^3$ is preferably methyl group or isobutyl group. b is from 2 to 40 and c is from 1 to 40.

The above aluminoxane is prepared by various methods. The method is not specifically limited, and the aluminoxane may be prepared according to a publicly known method. For example, the aluminoxane is prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)$ and (C3) a boron compound represented by the general formula $(L-H)^+(BQ^1Q^2Q^3Q^4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are as defined in $Q^1$ to $Q^3$.

Specific examples of $G^+$ as an inorganic cation in the compound represented by the general formula $G^+(BQ^1Q^2Q^3Q^4)^-$ include ferrocenium cation, alkyl-substituted ferrocenium cation, silver cation, etc. Examples of the $G^+$ as an organic cation include triphenylmethyl cation. $G^+$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combination of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl)borate, etc., most preferably triphenylmethyltetrakis(pentafluorophenyl)borate.

In the boron compound (C3) represented by the formula $(L\text{-}H)^+(BQ^1Q^2Q^3Q^4)^-$, L represents a neutral Lewis base; $(L\text{-}H)^+$ represents a Brfnsted acid; B represents a boron atom in the trivalent valence state; and $Q^1$ to $Q^4$ are as defined in $Q^1$ to $Q^3$.

Specific examples of $(L\text{-}H)^+$ as a Brfnsted acid in the compound represented by the formula $(L\text{-}H)^+(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combination of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl)borate, N,N-dimethylaniliniumtetrakis(pentafluorophenyl)borate, N,N-diethylaniliniumtetrakis(pentafluorophenyl)borate, N,N-2,4,6-pentamethylaniliniumtetrakis(pentafluorophenyl)borate, N,N-dimethylaniliniumtetrakis(3,5-bistrifluoromethylphenyl)borate, diisopropylammoniumtetrakis(pentafluorophenyl)borate, dicyclohexylammoniumtetrakis(pentafluorophenyl)borate, triphenylphosphoniumtetrakis(pentafluorophenyl)borate, tri(methylphenyl)phosphonium tetrakis(pentafluorophenyl)borate, tri(dimethylphenyl)phosphonium tetrakis(pentafluorophenyl)borate, etc., most preferably tri(nbutyl)ammoniumtetrakis(pentafluorophenyl)borate or N,N-dimethylanilinumtetrakis(pentafluorophenyl)borate.

In the use of (C1) and (C2) of the present invention, an olefin polymerization catalyst obtained by using a transition metal compound (A) represented by the general formula[I], and (B) described above and/or (C) described above. In case of an olefin polymerization catalyst consisting of two components (A) and (B), the above cyclic aluminoxane (B2) and/or linear aluminoxane (B3) are preferable as (B). Other preferable embodiment of the catalyst for olefin polymerization includes an olefin polymerization catalyst obtained by using the above (A), (B) and (C), and as (B), the above (B1) is easily used.

The respective components are desirably used so that a molar ratio of (B)/(A) is usually within the range from 0.1 to 10000, preferably 5 to 2000 and a molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for supplying the respective components in a polymerization reactor. The respective components are desirably used so that the concentration of (A) is usually from 0.01 to 500 $\mu$mol/g, preferably from 0.05 to 100 $\mu$mol/g, more preferably from 0.05 to 50 $\mu$mol/g; the concentration of (B) is usually from 0.01 to 10000 $\mu$mol/g, preferably from 0.1 to 5000 $\mu$mol/g, more preferably from 0.1 to 2000 $\mu$mol/g, in terms of Al atom; and the concentration of (C) is usually from 0.01 to 500 $\mu$mol/g, preferably from 0.05 to 200 $\mu$mol/g, more preferably from 0.05 to 100 $\mu$mol/g.

As polymerization, a solvent polymerization using an aliphatic hydrocarbon such as butane, pentane, hexane, heptane, octane or the like; an aromatic hydrocarbon such as benzene, toluene or the like; or a halogenated hydrocarbon such as methylene dichloride or the like, as a solvent, or a slurry polymerization, a bulk polymerization in a liquid monomer, a gas phase polymerization in a gaseous monomer, or the like is possible, and both of a batch-wise polymerization and a continuous polymerization are possible.

The polymerization temperature is usually −50° C. to 200° C. and preferably within the range of −20° C. to 100° C., and the polymerization pressure is preferably normal pressure to 60 kg/cm$^2$ G. In general, the polymerization time is appropriately determined according to the kind of a catalysts used and a reaction apparatus, and 1 minute to 20 hours can be adopted. And, a chain transfer agent such as hydrogen or the like can be added for adjusting the molecular weight of the polymer.

The above (A), and (B) and/or (C) may be introduced in the reactor after previously mixing them. Alternatively, there can be a method which comprises independently introducing them through a respective separate introducing tube and mixing them in the reactor. In case of a system of a plurality of reaction zones, they may be collectively introduced in the first reaction zone, or may also be divisionally introduced in other reaction zone.

In the thermoplastic elastomer composition in the present invention, it is observed by a transmission type electron microscope (TEM) that (b) has a nature of being finely dispersed in an amorphous phase of (a) at size of from several 10 nm to several 100 nm.

The (b) used in the present invention is a rubbery polymer imparting a new single tan δ peak at a temperature different from that of the tan δ peak of (a) and that of the tan δ peak of (b), and within the range from −70 to 30° C. in a temperature dependence curve of tan δ determined by solid dynamic viscoelasticity measurement of the composition obtained by kneading with (a). Herein, the "single" means that it has only one maximum value within said temperature range. The peak temperature of the new tan δ peak may differ from both of that of the tan δ peak of (a) and that of the tan δ peak of (b), and is usually lower temperature side than the peak temperature of the olefin-based resin. Further, since the behavior cannot be observed when the kneading of (b) with (a) is insufficient, it is observed by kneading them at kneading strength of a shear rate of about $1\times10^2$/sec or more. The measurement of solid viscoelasticity can be carried out using a usual measurement apparatus of solid viscoelasticity.

The thermoplastic elastomer composition in the present invention contains 100 parts by weight of the above-mentioned (a) and 10 to 250 parts by weight of (b), and preferably 100 parts by weight of (a) and 40 to 200 parts by weight of (b). When the content of (b) is too little, the flexibility of the molded article obtained is inferior, and on the other hand, when the content is too much, a sticky touch on the obtained molded article is caused.

Further, the pigment (d) can be added to the above-mentioned (a) and (b) in the present invention. As said pigment (d), organic pigments such as- azo-based pigments, phthalocyanine-based pigments, threne-based pigments, lakes of dyes, etc., and inorganic pigments such as oxide-basedpigments such as titaniumoxide, etc., chromo acid and molybdic acid-based pigments, selenium sulfide compounds, ferrocyanide compounds, carbon black, etc. are used.

When powder pigments are used as the pigment (d), the primary particle diameter is preferably 300 nm or less, further preferably 200 nm or less, and preferably 150 nm or less in particular. And, those supported on a carrier such as calcium carbonate, a metal soap, magnesium oxide or the like can be used. In this case, the primary particle diameter of the carrier is usually 10 μm or less, and preferably 1 μm to 5 μm. Wherein the weight ratio of the powder pigment to the carrier is usually 20:80 to 80:20, and preferably 25:75 to 75:25.

Further, a corresponding commercial available product can be used as (d).

The improvement of solvent resistance of the obtained molded article can be attained by adding (d) in the present invention.

The amount of (d) is usually 10 parts by weight or less per 100 parts by weight of the above-mentioned (a), preferably 0.01 to 10 parts by weight, and more preferably 0.1 to 5 parts by weight. When the content of (d) is too little, the improvement of masking property of the molded article obtained becomes insufficient, and on the other hand, when said content is too much, the improvement of solvent resistance of the molded article obtained becomes insufficient. In addition, when a powder pigment supported on a carrier as (d) is used, the weight of the carrier is not included. Further, when the pigment is contained in the thermoplastic elastomer composition, the masking property (homogeneous coloring property) of the molded article obtained is good.

Further, the thermoplastic elastomer composition used in the present invention may contain (e) an ethylene-α-olefin-based copolymer having an α-olefin unit content of less than 50% by weight in addition to (a) and (b) of essential components. When (e) is contained, the thermoplastic elastomer composition superior in cost and performance is provided without deteriorating the powder moldability of the thermoplastic elastomer composition powder and the whitening resistance on bending of the molded article prepared by powder molding said powder.

The ethylene-α-olefin-based copolymer (e) having an α-olefin unit content of less than 50% by weight includes a copolymer of ethylene and an α-olefin, a copolymer of ethylene, an α-olefin and a non-conjugated diene, etc., and a polymer having little crystallinity or a crystallinity of less than 50%. Herein, as the α-olefin, α-olefins having 3 to 10 carbon atoms such as propylene, 1-butene, 3-methyl-1-butene, etc., and as the non-conjugated diene, non-conjugated dienes having 5 to 15 carbon atoms such as dicyclopentadiene, 5-ethylidene-2-norbornene, 1,4-hexadiene, 1,5-cyclooctadiene, 5-methylene-2-norbornene, etc. are respectively exemplified. Examples of such ethylenea α-olefin-based copolymer include an ethylene-propylene copolymer, an ethylene-butene copolymer, an ethylene-propylene-ethylidenenorbornene copolymer (hereinafter, referred to as "EPDM"), etc. The ethylene-α-olefin-based copolymer may be crosslinked. The content of α-olefin unit in the ethylene-α-olefin-based copolymer (e) having an α-olefin unit content of less than 50% by weight is preferably 5 to 40% by weight, and more preferably 10 to 35% by weight, and the content of ethylene unit is usually 60 to 95% by weight, and preferably 65 to 90% by weight. The content of α-olefin unit and the content of ethylene unit can be determined by $^{13}$C-NMR, infrared rays absorption spectrometry, etc. Further, when the molded article is produced by powder molding using the thermoplastic elastomer composition powder of the present invention, Mooney viscosity $\{ML_{1+4}(100° C.)\}$ measured at 100° C. according to ASTM D-927-57T of the ethylene-α-olefin-based copolymer is preferably 10 to 350 and more preferably 15 to 300, from the viewpoint of the strength of the molded article obtained.

The amount of (e) in case of using (e) is 250 parts by weight or less per 100 parts by weight of (a) and preferably 20 to 200 parts by weight. When (e) is too much, a sticky touch may be appeared on the molded article obtained.

The complex dynamic viscosity η*(1) at 250° C. of the thermoplastic elastomer composition of the present invention is required to be $1.5\times10^5$ poise or less, preferably $1\times10^2$ to $8\times10^3$ poise and more preferably $3\times10^2$ to $5\times10^3$ poise.

Wherein the complex dynamic viscosity η*(ω) is a value calculated by using a storage modulus G'(ω) and loss modulus G"(ω) at 250° C. and at a vibration frequency of ω according to the calculation equation (3) described below:

$$\eta^*(\omega)=\{[G'(\omega)]^2+[G''(\omega)]^2\}^{1/2}/\omega \quad (3)$$

and the complex dynamic viscosity η*(1) is a complex dynamic viscosity at ω of 1 radian/second.

When η*(1) exceeds the above-mentioned upper limit, the melt flow property of the thermoplastic elastomer composition becomes poor and it tends-to become difficult to produce a molded article by a molding method in which the shear rate on molding is usually as low as 1 $sec^{-1}$ or less, such as powder molding or the like.

The Newtonian viscosity index n of the thermoplastic elastomer composition of the present invention is required to be 0.67 or less, preferably 0.01 to 0.35 and more preferably 0.03 to 0.25.

Herein, the Newtonian viscosity index n is a value calculated by using the above-mentioned complex dynamic viscosity η*(1) and a complex dynamic viscosity η*(100)

measured at 250° C. and a vibration frequency ω of 100 radian/second according to the calculation equation (4) described below:

$$n=\{\log \eta^*(1)-\log \eta^*(100)\}/2 \quad (4)$$

When the Newtonian viscosity index n exceeds above-mentioned upper limit, the mechanical strength of the molded article obtained becomes poor.

As the processes for preparing the thermoplastic elastomer composition used in the present invention, for example, the following processes can be mentioned. Namely, (a) and (b) and if necessary, (d) and (e) may be melt-kneaded. Furthermore, after selecting all components or some components among (a) and (b) and if necessary, (d) and (e) and then kneading or dynamically crosslinking them, the composition can be also produced by melt-kneading with the components not selected. For example, the thermoplastic elastomer composition of the present invention in which (a) and/or (e) is crosslinked in intramolecular and/or intermolecular, can be usually produced by further adding and kneading (b) and if necessary, (d) after dynamically-crosslinking (a) and (e). Herein, a single screw extruder, a biaxial extruder or the like can be used for kneading. Further, the compounding of various additives described below can be carried out, for example, by using (a), (b) (d) or (e) in which these additives are previously compounded, or by compounding at kneading or dynamic crosslinking the above-mentioned components.

The dynamic crosslinking of said melt-kneaded mixture can be carried out, for example, by kneading said melt-kneaded mixture with a crosslinking agent under heating. As the crosslinking agent, organic peroxides such as 2,5-dimethyl-2,5-di(tert-butylperoxyno)hexane, dicumyl peroxide, etc. are used. The crosslinking agent is usually used in an amount of 1 part by weight or less per 100 parts by weight of the total of the components to be crosslinked among (a), (b) and if necessary, (e), preferably 0.1 to 0.8 parts by weight, and more preferably 0.2 to 0.6 parts by weight. When the organic peroxide is used as the crosslinking agent, it is possible to obtain the thermoplastic elastomer composition which gives a molded article having an excellent heat resistance by carrying out the dynamic crosslinking in the presence of a crosslinking aid such as a bismaleimide compound, or the like. In this case, the amount of the organic peroxide used is usually 0.8 parts by weight or less based on 100 parts by weight of the total of the components to be crosslinked among (a), (b) and if necessary, (e) to be crosslinked, preferably 0.2 to 0.8 parts by weight, and more preferably 0.4 to 0.6 parts by weight.

The amount of the crosslinking aid used is usually 1.5 parts by weight or less per 100 parts by weight of the total of (a), (b) and if necessary, (e) to be crosslinked, preferably 0.2 to 1 part by weight, and more preferably 0.4 to 0.8 parts by weight. The crosslinking aid is preferably blended before the addition of the crosslinking agent, and usually added at preliminarily kneading of the fore-mentioned components to be crosslinked.

The crosslinking of (a), (b) and (e) can be carried out by kneading the components to be crosslinked, a crosslinking agent and, if necessary, a further crosslinking aid under heating, for example, at a temperature of 150 to 250° C., using a uniaxial extruder, a biaxial extruder or the like.

The thermoplastic elastomer composition of the present invention may contain various additives, for example, mineral oil softeners, thermal stabilizers such as phenol-based, sulfite-based, phenylalkane-based, phosphite-based, amine-based and amide-based stabilizers and the like, anti-aging agents, weathering stabilizers, antistatic agents, metal soaps, waxes, etc. Further, the thermoplastic elastomer composition may contain a polymer component providing two tan δ peaks within a temperature range of −70 to 30° C. in the tan δ-temperature dependence curve obtained by the solid viscoelasticity measurement of the composition prepared by kneading with (a), for example, such as a conjugated diene-based copolymer rubber, a natural rubber, a rubbery polymer such as a butyl rubber, a chloroprene rubber, an epichlorohydrin rubber, an acrylic rubber or the like, other polymer component such as an ethylene-acrylic acid copolymer, ethylene-vinyl acetate copolymer and its saponified product, ethylene-methyl methacrylate copolymer, an ethylene-glycidylmethacrylate-vinyl acetate copolymer or the like which have said property, as long as it does not damage the objective of the present invention.

These additives and other polymer components may be previously contained in (a), (b) and (e), to be used, or may be compounded during the above-mentioned kneading and dynamic crosslinking, or by successively kneading or the like.

The thermoplastic elastomer composition containing the mineral oil softener is superior in melt fluidity, and provides a molded article superior in flexibility. When the oil-extended olefin-based copolymer in which the mineral oil softener is previously contained in (e) is used, the above-mentioned kneading and dynamic crosslinking can be easily carried out.

Further, in order to produce the thermoplastic elastomer composition of the present invention, which satisfies the values of physical properties represented by the above-mentioned complex dynamic viscosity and the Newtonian viscosity index, the degree of the kneading and dynamic crosslinking, the kinds and amounts used of the respective components constituting said thermoplastic elastomer composition, the kinds and amounts of the crosslinking agent and crosslinking aid used in the dynamic crosslinking, and the kinds and amounts of the additives used are suitably selected. Particularly, the shear rate in the kneading and dynamic crosslinking influences the above-mentioned physical properties greatly, and it is preferable to carry out the kneading and dynamic crosslinking at a shear rate of $1\times10^3$/sec. or more.

The thermoplastic elastomer composition powder of the present invention can be produced by pulverizing the thermoplastic elastomer composition obtained by the fore-mentioned method, and successively adding the fine powder (c).

As the method of pulverizing the thermoplastic elastomer composition, a freeze-pulverization method is mentioned. The freeze-pulverization method is a method of cooling said thermoplastic elastomer composition to it's glass transition temperature or less, preferably −70° C. or less, more preferably −90° C. or less, and pulverizing it while keeping the cooling condition. Moreover, it is possible to pulverize the thermoplastic elastomer composition at a higher temperature than it's glass transition temperature, but the particles of the obtained pulverized product are irregular in size and the powder molding of the powder prepared by adding the fine powder tends to become difficult.

Further, it is preferable in order to pulverize while keeping the cooling condition of the thermoplastic elastomer composition, to pulverize by a method which is good in pulverization efficiency and low in heat generation. For example, a mechanically pulverizing method of using an impact pulverizer such as a ball-mill or the like is used. The thermoplastic elastomer composition powder obtained by the method has usually sizes which pass 24 mesh (sieve opening of 700 μm×700 μm) of the Tyler standard sieve, preferably sizes which pass 28 mesh (a sieve opening of 590 μm×590 μm), more preferably sizes which pass 32 mesh (a sieve opening of 500 μm×500 μm), and particularly sizes which pass 42 mesh (a sieve opening of 355 μm×355 μm).

The fine powder (c) used in the present invention is a fine powder having a primary particle diameter of 300 nm or less.

As (c) used in the present invention, inorganic oxides, a polyvinyl chloride resin for a paste, metallic salts of fatty acids, and the like are mentioned. Provided that powder pigments (preferably the same color as the pigment (d)) as the fine powder (c) may be suitably added, in addition to the pigment as (d). Further, the use as (d) concerning the pigment is preferable from the viewpoint of solvent resistance of the molded article obtained in comparison with the use for blending onto the pulverized product of the thermoplastic elastomer composition.

It is required that the primary particle diameter of the fine powder (c) is 300 nm or less, preferably 200 nm or less, and more preferably 5 nm to 150 nm. When the primary particle diameter exceeds 300 nm, the improvement of powder flowability of the thermoplastic elastomer composition powder obtained is insufficient, and defects such as underfill, pinholes and the like are brought about on the molded article obtained by powder molding. Herein, the primary particle diameter is a value which is determined by taking a picture of (C) of with a transmission electron microscope (TEM), randomly selecting about 1000 numbers of particles to measure diameters of these particles, and dividing the sum of these particle diameters by particle numbers.

The inorganic oxide includes alumina, silica, alumina silica, etc. Alumina is a fine powder mostly constituted by the chemical formula of $Al_2O_3$ unit. Further, alumina has various crystal shapes, and alumina of any crystal shape can be used. These are named as α-alumina, β-alumina, γ-alumina, etc. in accordance with their crystal shapes. They include alumina C (γ-alumina) manufactured by Degussa AG., AKP-G008 (α-alumina) manufactured by Sumitomo Chemical Co., Ltd., etc.

Silica is a fine powder mostly constituted by the chemical formula of $SiO_2$ unit. It is produced by methods such as a pulverization of natural diatomaceous earth, a decomposition of sodium silicate, etc. OX 50 manufactured by Degussa AG, etc are mentioned. Alumina silica is an inorganic oxide containing the fore-mentioned alumina and silica as main components. The surface of these inorganic oxides may be coated with a dimethylsilicone oil or the like, and may be treated with a trimethylsilyl group, or the like.

These (C) are used alone or in combination of a plural number of those having a primary particle diameter of 300 nm or less. For example, the inorganic oxide can be used alone, or the powder pigment and the inorganic oxide can be used in combination.

As the powder pigments, organic pigments such as azo-based, phthalocyanine-based and threne-based pigments, lakes of dyes, etc., and inorganic pigments such as oxide-based (e.g. titanium oxide), chromo acid and molybdic acid-based pigments, a selenium sulfide compound, a ferrocyanide compound, carbon black and the like are used.

The amount of the fine powder (c) added is 0.1 to 5 parts by weight per 100 parts by weight of the pulverized product of the thermoplastic elastomer, and preferably 0.2 to 3 parts by weight. When the amount added is less than 0.1 parts by weight, good powder flow property and powder-moldability are not obtained. When the amount added exceeds 5 parts by weight, the thermal fusion among the particles of pulverized product is deteriorated, therefore the strength of a molded article obtained tends to become inferior.

The method of compounding the fine powder (c) with the pulverized product of the thermoplastic elastomer is not specifically limited, if it is a method of homogeneously adhering the fine powder (c) on the pulverized product of the thermoplastic elastomer. For example, there are mentioned a method of blending using a blender equipped with a jacket or a high speed rotation type mixer or the like. Among them, a method of homogeneously dispersing the powders while preventing the mutual adherence of the powders by adding a shear stress such as a Henschel mixer and a super mixer, is preferable. Further, the compounding is usually carried out at room temperature. Further, the thermoplastic elastomer composition powder used in the present invention may be blended with 0.1 to 5 parts by weight of a powder (f) having a primary particle diameter of more than 300 nm and 10 μm or less per 100 parts by weight of the pulverized product of the thermoplastic elastomer, in addition to the fine powder (c). Herein, (f) may be simultaneously blended during the compounding of the fore-mentioned (c), or (f) may be blended after the compounding of (c), or (c) may be blended after the compounding of (f).

In this case, the thermoplastic elastomer composition powder having more improved bulk specific gravity (packing property) and anti-coagulation property in comparison with the case of using (c) alone, can be obtained.

As (f), powder pigments, inorganic oxides, a polyvinyl chloride resin for a paste, metallic salts of fatty acids, calcium carbonate, etc. similar to (c), are mentioned. The added amount of (f) is usually 0.1 to 5 parts by weight per 100 parts by weight of the pulverized product of the thermoplastic elastomer, and preferably 0.2 to 4 parts by weight. When the amount added exceeds 5 parts by weight, thermal fusion among the thermoplastic elastomer powders of the present invention is deteriorated, therefore the strength of a molded article obtained tends to become poor. Further, in this case, the weight ratio of (f) to (c) is usually 20:80 to 80:20, and preferably 25:75 to 60:40.

The above-mentioned thermoplastic elastomer composition powder can be applied to various powder molding methods such as a powder slush molding method, a fluidization dip method, an electrostatic coating method, a powder spray method, a powder rotational molding method and the like. For example, the powder slush molding method is carried out as follows.

The first step: a step of coating a fluorine-based and/or silicone-based mold releasing agent on the molding surface of a mold.

When the powder molding using the thermoplastic elastomer powder of the present invention is carried out, the molded article obtained happens to be broken by excessively trying to remove the molded article from the mold in the 6th step because of a strong adhering force with a mold inner surface. Accordingly, the mold inner surface is preferably coated with a spray such as a silicone-based spray, a fluorine-based spray or the like in advance, although it is not essential. For example, KF96SP (a product diluted in an organic solvent) manufactured by Shin-Etsu Silicone Co., Ltd., etc. as the silicone-based spray, and Daifree GA-6010(a product diluted in an organic solvent) and ME-413 (a product diluted in water) manufactured by Daikin Co., Ltd., etc. are mentioned.

The second step: a step of feeding the thermoplastic elastomer composition powder on the molding surface of a mold heated to a melting temperature of the thermoplastic elastomer composition powder or higher.

The thermoplastic elastomer composition powder is fed on the molding surface of a mold heated to a melting temperature of said composition or higher, usually 160 to 320° C., and preferably 210 to 300° C. In this method, the mold is heated, for example, by a gas heating furnace system, a heat transfer medium oil circulation system, a system of dipping in heat transfer medium oil or hot fluidized sand, a high frequency induction heating system or the like. The heating time for fusing the thermoplastic elastomer composition powder by heat is properly selected in accordance with the size and thickness of molded article desired.

The third step: a step of heating the thermoplastic elastomer composition powder on the molding surface of the second step for a predetermined time thereby mutually fusing the powder whose at least surface is melted.

The fore-mentioned powder is heated on said molding surface for a predetermined time, and the powder whose at least surface is melted is mutually fused.

The fourth step: a step of recovering non-fused powder after a lapse of the predetermined time in the third step.

After a lapse of said predetermined time, non-fused powder is recovered.

The fifth step: a step of additionally heating the mold on which the thermoplastic elastomer composition powder melted is mounted, according to requirement.

If necessary, the mold on which the thermoplastic elastomer composition powder melted is mounted is additionally heated.

The sixth step: a step of cooling the mold after the fifth step and taking out a molded article formed thereon from the mold.

After cooling the mold, a molded article formed thereon is removed from the mold.

Further, when the thermoplastic elastomer composition powder is produced, it is effective to reduce a load required for removing the molded article in the fore-mentioned sixth step if the fore-mentioned lubricant is internally compounded. The amount of the lubricant added is usually 5 parts by weight or less per 100 parts by weight of the thermoplastic elastomer composition, and preferably 0.1 to 2 parts by weight. When the amount of the lubricant added exceeds 5 parts by weight, problems such as a decrease of strength of the molded article obtained, a contamination of the mold surface and the like, happen to occur.

The molded article prepared from the thermoplastic elastomer composition powder of the present invention has characteristics that there is no defect such as underfill, pinholes, etc. even in a complicated shape and the molded article is hardly whitened even though being bent. Further, when (d) is added thereto, solvent resistance is improved.

Further, a foamed molded-article can be produced by powder molding the thermoplastic elastomer composition powder of the present invention containing a foaming agent and further foaming the resulting article.

The foaming agent may be previously contained in the inside of powder or pellets, or may be coated on the surface of the thermoplastic elastomer composition powder with a rotary mixer such as the fore-mentioned Henschel mixer or the like. The foaming agent may be blended after obtaining the thermoplastic elastomer composition powder by the fore-mentioned method, or can be simultaneously blended with the fine powder (c) used in the present invention.

As the foaming agent, a thermal decomposition type foaming agent is usually used. Examples of the thermal decomposition type foaming agent include azo compounds such as azodicarbonamide, 2,2'-azobisisobutyronitrile, diazodiaminobenzene and the like; sulfonyl hydrazide compounds such as benzenesulfonyl hydrazide, benzene-1,3-sulfonyl hydrazide, p-toluenesulfonyl hydrazide and the like; nitroso compounds such as N,N'-dinitrosopentamethylenetetramine, N,N'-dinitroso-N,N'-dimethylterephthalamide and the like; azide compounds such as terephthalazide and the like; and carbonates such as sodium hydrogencarbonate, ammonium hydrogencarbonate, ammonium carbonate and the like. Among them, azodicarbonamide is preferably used. The compounding of foaming agent is usually carried out at a temperature lower than the decomposition temperature of the foaming agent. The thermoplastic elastomer composition powder of the present invention may contain a foaming aid and a cell adjuster, together with the foaming agent.

The molded article obtained by molding the thermoplastic elastomer composition powder of the present invention is useful as a skin material, and a two-layer molded article in which a foamed layer is laminated on one side may be used as the skin material. Such two-layer molded article can be integrally produced by the powder molding method (refer to Japanese Patent Publication (Kokai) No. Hei 5-473, etc.), and can also be produced by bonding a foamed article separately produced on the molded article obtained as described above with an adhesive or the like.

When the two-layer molded article is produced according to the powder molding, the two-layer molded article can be produced, for example, by heating a mold which may optionally have a complicated pattern on its molding face to the melting temperature or higher of the thermoplastic elastomer composition powder, then feeding the above-mentioned thermoplastic elastomer composition powder onto the molding face of said mold, mutually fusing the powder to form a sheet-like fused article on said molding face, successively removing the excess powder which was not fused, then feeding the thermoplastic elastomer composition powder containing a foaming agent (further, the powder compounded with the fine powder (c), or one not compounded with that can be also used) onto the sheet-like fused article, mutually fusing the powder to obtain a sheet-like fused article on said molding face, removing the excess powder which was not fused, and successively further heating it to foam to form a foamed layer.

Further, it is also possible to produce a complex molded article composed of a non-foamed layer/a foamed layer/a non-foamed layer according to the powder molding method. Herein, the non-foamed layers may be the same or different.

Further, it is also possible to produce a complex molded article composed of a non-foamed layer/a foamed layer/a non-foamed layer according to the powder molding method. Herein, the non-foamed layers may be the same or different.

As the foaming agent, a thermal decomposition type foaming agent in like manner as mentioned above is mentioned. Examples of the polymer components in the thermoplastic polymer composition containing such foaming agent include a vinyl chloride-based resin, a polyolefin, an olefin-based thermoplastic elastomer and the like. Further, a polyethylene-based expandable composition used in Japanese Patent Publication (Kokai) No. Hei 7-228720 can also be used as a thermoplastic polymer composition containing a foaming agent.

The fine powder used in the present invention may be blended with the polyethylene-based expandable composition powder.

Further, a polyurethane foam can be also used as a foamed layer. In this case, adhesion property between the polyurethane and the thermoplastic elastomer composition of the present invention is apt to be inferior, therefore the adhesion property can be improved by pre-treating the adhered face of a molded article with a primer such as a chlorinated polyethylene or the like, in usual.

Further, the polyurethane foam is formed by fixing the above-mentioned molded article and a core material described later at a fixed space, pouring a mixed liquid of a polyol and a polyisocyanate in the gap and foaming it under pressure.

Such a molded article or two-layer molded article is preferably suitable as a skin material laminated on a thermoplastic resin core material. For example, the above-mentioned molded article can be used for a multi-layer molded article in which the thermoplastic resin core material is laminated on one face side, and the two-layer molded article can be used for a multi-layer molded article in which the core material of a thermoplastic resin is laminated on the foamed layer side.

As the thermoplastic resin in the thermoplastic resin core material, thermoplastic resins such as, for example, a polyolefin such as polypropylene, polyethylene or the like; ABS resin (acrylonitrile-butadiene-styrene copolymer) and the like are used. Among them, a polyolefin such as polypropylene or the like is preferably used.

Such multi-layer molded article can be easily produced by a method of feeding and pressuring a molten thermoplastic resin onto one side face of the molded article, or a method of feeding and pressuring a molten thermoplastic resin on the foamed layer side of the two-layer molded article.

The molten thermoplastic resin is a thermoplastic resin which is in a molten state by being heated to a temperature higher than the melting point. The feeding of the molten thermoplastic resin may be carried out before pressurization or simultaneously at pressurization. Further, the pressurization may be carried out using a mold or the like, and may be carried out by a feeding pressure of the molten thermoplastic resin. Examples of such molding methods include an injection molding, a low-pressure injection molding, a low-pressure compression molding, etc.

Specifically, for example, when the above-mentioned molded article is used as a skin material, the molded article is fed between a pair of mold members freely mobilized, and then both mold members may be closed after feeding or while feeding the molten thermoplastic resin between the one face side of said molded article and the one side of the mold facing with the molded article. When the two-layer molded article is used as a skin material, the two-layer molded article is fed between a pair of mold members freely mobilized, and then both mold members may be closed after feeding or while feeding the molten thermoplastic resin between the foamed layer of said molded article and the one side of the mold facing with the foamed layer. Herein, the direction of opening and closing of both mold members is not specifically limited, and may be a vertical or horizontal direction.

When the molded article or the two-layer molded article produced by using the fore-mentioned mold for powder molding is used as the skin material, the mold for powder molding can be used as one side of mold members in the production of the fore-mentioned multi-layer molded article while holding said molded article or two-layer molded article on the molding face. According to this method, the multi-layer molded article desired can be produced with hardly any damaging of the pattern provided on the surface, because the molded article or two-layer molded article to which the patterns of mold were transcribed is fed between a pair of mold members without being released from the mold.

The molten thermoplastic resin may be fed after completion of a closing of both mold members, but both mold members are preferably closed after feeding or while feeding during which mold members are unclosed, from the viewpoint that the shift of molded article or two-layer molded article of the skin material is minimized and a multi-layer molded article with an improved transcription degree of a desired pattern is obtained. The method of feeding the molten thermoplastic resin is not specifically limited, and the molten thermoplastic resin can be fed, for example, through a conduit of the resin equipped in the mold member facing the molded article or two-layer molded article. And, the molten resin is fed after inserting a feeding nose for the molten resin between both mold members, and then both mold members may be closed after the feeding nose is drawn out of the system.

As a pair of the mold members, a pair of male/female mold members wherein the outer periphery of one mold member and the inner periphery of the other mold member are capable of being able to slide, can be used. In this case, a multi-layer molded article having an excess skin material at the edge portion is obtained by setting a clearance between the sliding faces of both mold members to almost the same value as the thickness of the molded article or two-layer molded article. A multi-layer molded article coated with the skin material in every edge portion can be produced by turning up the excess skin material to the back surface of the multi-layer molded article.

The present invention is illustrated in more detail according to the Examples below, but the present invention is not limited to these Examples.

Evaluation of the thermoplastic elastomer composition and the molded article was carried out according to the methods below.

[1] Complex dynamic viscosity $\eta^*(1)$ and Newtonian viscosity index n

Using a dynamic analyzer manufactured by Rheometrics Co., Ltd. (Model RDS-7700), a storage modulus $G'(\omega)$ and a loss modulus $G''(\omega)$ were measured at a vibration frequency $\omega$ of 1 radian/second or 100 radian/second, and then complex dynamic viscosities $\eta^*(1)$ and $\eta^*(100)$ were calculated by the fore-mentioned calculation equation (3). Further, the measurement was carried out at a parallel plate mode under the conditions of an applied strain of 5% and a sample temperature of 250° C. Further, Newtonian viscosity index n was calculated by the fore-mentioned calculation equation (4) using $\eta^*(1)$ and $\eta^*(100)$.

[2] Ratio of number of conjugated diene units hydrogenated which have side chains having 2 or more carbon atoms to number of total conjugated diene units hydrogenated, in (b).

The ratio was determined by measuring $^1$H-NMR spectrum (400 MHz) at a concentration of 1.6 mg/ml using o-xylene-d10 as a solvent.

[3] Solid viscoelasticity

Using a solid viscoelasticity measuring apparatus, REOVIBRON(DDV-II-EA model), manufactured by Orientech Industries Inc.), tension mode was employed. A sample of 2 cm×5 cm (provided that a distance between chucks is 3.5 cm)×0.1 mm in thickness was made by a press molding method and the measurement was carried out by vibrating the sample within the range of −150° C. to 130° C. at a heating rate of 2° C./min., a vibration frequency of 110 Hz and a vibration amplitude of 16 $\mu$m to determine a peak temperature and an intensity of a tan $\delta$ peak.

[4] Bulk specific gravity of thermoplastic elastomer composition powder

A bulk specific gravity was calculated according to JIS K-6721 by collecting and weighing 100 ml of the thermoplastic elastomer powder. The measurement was carried out at 23° C.

[5] Powder flowability of thermoplastic elastomer composition powder 100 ml of the thermoplastic elastomer powder collected in the above-mentioned [4] was charged in a funnel for measuring a bulk specific gravity described in JIS K-6721 and then a damper is pulled off, and a time (second) from the start to the finish of falling of all the powder was measured. The measurement was carried out at 23° C.

[6] Evaluation of molded article

Figure 3:
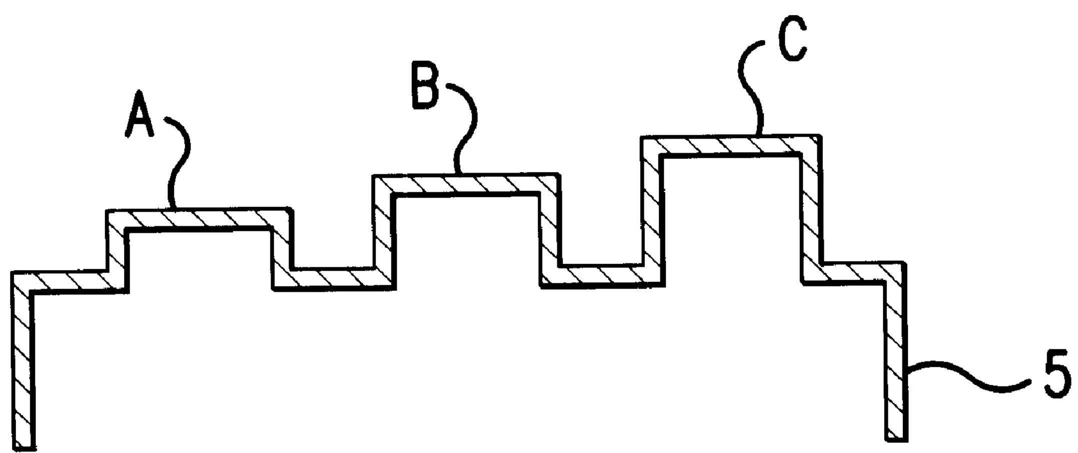
FIG. 3 is a cross-sectional view of the molded article.

In a molded article obtained, the presence or absence of pinhole and underfill at respective edges of three protrusions, A (a height of 7 mm, a width of 25 mm), B (a height of 11 mm, a width of 25 mm) and C (a height of 15 mm, a width of 25 mm) shown in FIG. 3, was observed by naked eyes, and the results were evaluated according to the four criteria below.

1: A pinhole and underfill occurred on any of the protrusions A, B and C.

2: A pinhole and underfill were not found at the protrusion A, but a pinhole and underfill occurred at the edges of the protrusions B and C.

3: A pinhole and underfill were not found on the protrusions A and B, but a pinhole and underfill occurred at the edge of the protrusion C.

4: A pinhole and underfill did not occur at any of the protrusions A, B and C.

[7] Whitening on bending

The molded sheet having a thickness of 1 mm which was obtained by the powder slush molding described below was cut into pieces of 1 cm×5 cm and bent by applying a bending load of 500 g or 1 kg, after one minute, the load was removed, and the evaluation was carried out on the basis of the width of the portion whitened on bending according to the criteria described below:

1: Width of the whitened portion is 2 mm or more.

2: Width of the whitened portion is 1 mm or more and less than 2 mm.

3: Width of the whitened portion is less than 1 mm.

4: No whitened portion is recognized.

[8] Solvent resistance

The molded sheet having a thickness of 1 mm which was obtained by the powder slush molding described below was cut into pieces of 15 cm×5 cm. A weight having a diameter of 60 mm and a weight of 500 g was wrapped up with a white cloth (flannel), immersed in a white gasoline (Red Horse clear gasoline: manufacture by Mobil Oil Co.) and rubbed on the above-mentioned molded sheet by 10 reciprocations (1 second per 1 reciprocation, a migration length of 50 mm in one way).

Solvent resistance was evaluated according to the criteria described below:

1: A white cloth was remarkably colored, and the molded sheet was remarkably whitened (discolored).

2: A white cloth was slightly colored, and the molded sheet was slightly whitened (discolored).

3: A white cloth was slightly colored, but the molded sheet was not whitened (not discolored).

4: A white cloth was not colored at all, and the molded sheet was not whitened (not discolored).

[(b) Rubbery polymer used]

In Examples below, a hydrogenated butadiene-styrene copolymer (styrene unit content=10% by weight, hydrogenation rate=99%, $\eta^*(1)=8.3\times10^3$ poise, n=0.16, MFR=10 g/10min., ratio of hydrogenated conjugated diene units having a side chain of at least two carbon atoms to hydrogenated total conjugated diene units=71%, peak temperature of tan δ peak=−17° C., intensity=1.5) was used as the component (b). Further, as (a), the fore-mentioned propylene-ethylene random copolymer resin (peak temperature of tan δ peak=−7° C., intensity =0.12, ethylene unit content=5% by weight, MFR=228 g/10 min.) was used.

These were kneaded under conditions of 180° C. and 50 rpm for 10 minutes according to the ratios of Table 1 using LABOPLASTMILL (Model 30C150 manufactured by TOYO SEIKI Co.) to obtain a composition (total amount charged to mill was 84 g), the peak temperature of tan δ peak and intensity of the composition obtained were determined according to the solid viscoelasticity measurement. The composition obtained gave a new single tan δ peak at a temperature different from that of the tan δ peak of (a) and that of the tan δ peak of (b) within the range of −70 to 30° C. These peak temperature of tan δ peak and intensity of the composition were shown in Table 1.

TABLE 1

Temperature and intensity of tan δ peak of composition composed of (a) and (b)

| Composition (parts by weight) | | | | | |
|---|---|---|---|---|---|
| (a) | 100 | 75 | 50 | 25 | 0 |
| (b) | 0 | 25 | 50 | 75 | 100 |
| Tan δ peak | | | | | |
| Temperature | 7 | −1 | −7 | −11 | −17 |
| Intensity | 0.12 | 0.20 | 0.39 | 0.73 | 1.5 |

EXAMPLE 1

[Production of thermoplastic elastomer composition powder]

Using a biaxial kneader, 100 parts by weight of a propylene-ethylene copolymer resin (content of ethylene unit=5% by weight, MFR=228 g/10 min., peak temperature of tan δ peak=−7° C., intensity=0.12), 100 parts by weight of a hydrogenated butadiene-styrene copolymer [styrene unit content=10% by weight, hydrogenation rate=99%, $\eta^*(1)=8.3\times10^3$ poise, n=0.16, MFR=10 g/10 min., ratio of hydrogenated conjugated diene units having a side chain of at least two carbon atoms to hydrogenated total conjugated diene units=71%, peak temperature of tan δ peak=−17° C., intensity=1.5], and 50 parts by weight of an ethylene-propylene copolymer rubber (SPO VO141 manufactured by Sumitomo Chemical Co., Ltd., content of propylene unit=27% by weight, MFR=1 g/10 min.) were kneaded at a shear rate of $1.2\times10^3$/sec. and a temperature of 200° C. to obtain a composition ($\eta^*(1)=2.7\times10^3$ poise, n=0.07), and the composition was cut with a cutter to obtain granules.

After cooling the granules to −120° C. with liquid nitrogen, they were pulverized while being kept under cooling conditions, and a pulverized product of thermoplastic elastomer composition [which passed a Tyler standard sieve 42 mesh (opening=355 μm×355 μm)] was obtained.

Using a Super Mixer (5L super mixer: SVM-5 manufactured by Kawada Seisakusho Co.), 1.0 part by weight of alumina (Alumina C; manufactured by Degussa Co., γ-alumina, primary particle diameter=13 nm) was blended with 100 parts by weight of the pulverized product of thermoplastic elastomer composition obtained in the above description at 23° C. and 1500 rpm for 5 minutes to obtain a thermoplastic elastomer composition powder.

[Production of molded article according to powder slush molding method]

Figure 2:
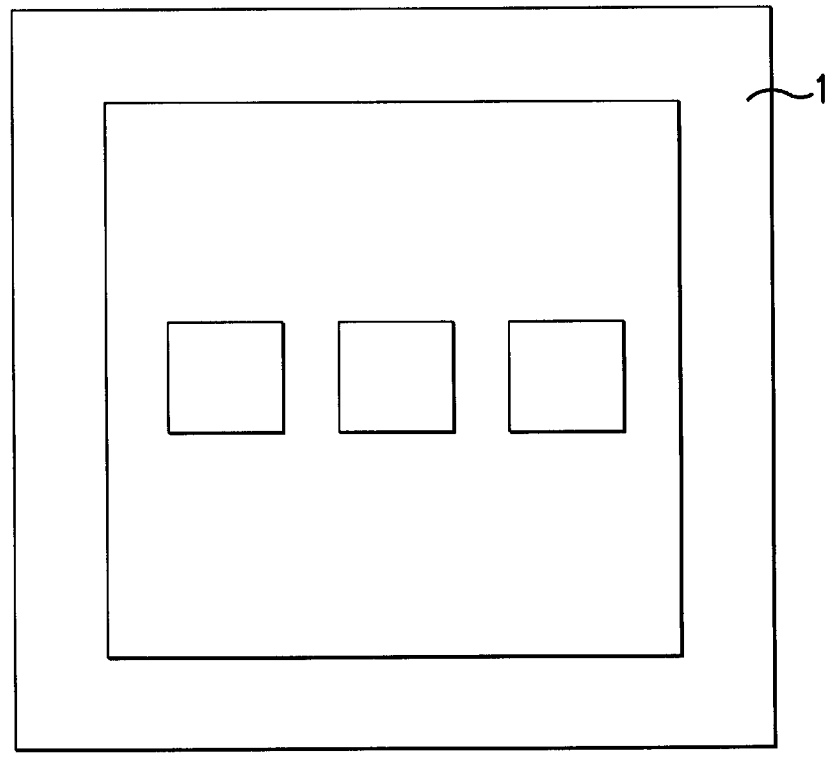
FIG. 2 is a frontal view of the mold for slush molding.

The thermoplastic elastomer composition powder (3) obtained was charged in a container (2), and then said container (2) and a mold (1) for slush molding were mutually fixed so that their peripheral parts is mated, and integrated (FIG. 1).

Wherein the mold (1) has three concave parts (depth=7 mm, 11 mm, 15 mm, width=25 mm, respectively) on the molding face as shown in FIG. 2, and all the molding face was a leather grain pattern. Further, the temperature of the mold (1) was 260° C.

Successively, the thermoplastic elastomer powder (3) was immediately charged on the molding face of the mold by rotating the integrated mold and container by 180° around the rotational axis (4) using a uniaxial rotar (not shown in FIGS.), then reciprocated at an amplitude range of 45° over 15 seconds for two rounds, and the thermoplastic elastomer powder was adhered and fused on the molding face. Then, the integrated mold and container were again rotated by 180°, and an extra thermoplastic elastomer composition powder which was not fused and not adhered was recovered in the container (2).

Then, the mold (1) in which the thermoplastic elastomer powder was adhered and fused on the molding face was removed from the container (2), heated for 1 minute in an oven of 260° C., successively cooled, and the resin was removed from the mold to obtain a molded article (5).

The molded article (5) has a thickness of 1.0 mm and three protrusions A (a height of 7 mm, a width of 25 mm), B (a height of 11 mm, a width of 25 mm) and C (a height of 15 mm, a width of 25 mm), and the leather grain pattern of the molding face of the mold was exactly transferred over the whole surface. The cross-sectional view of the molded article (5) is shown in FIG. 3. The properties of the thermoplastic elastomer composition powder and the evaluation results of the molded article are shown in Table 2.

EXAMPLES 2 TO 4

The same operation as in Example 1 was carried out to obtain a thermoplastic elastomer composition powder and obtain a molded article, except that silica (grade 380 manufactured by Japan Aerosil Co., primary particle diameter of 7 nm), silica (OX50 manufactured by Degussa AG, primary particle diameter of 40 nm), or alumina (AK-50 manufactured by Sumitomo Chemical Co., Ltd., α-alumina, primary particle diameter of 200 nm) were used in place of the alumina having a primary particle diameter of 13 nm. The evaluation results of the thermoplastic elastomer composition powder and the molded article are shown in Table 2.

EXAMPLES 5 TO 7

The same operation as in Example 1 was carried out to obtain a thermoplastic elastomer composition powder and obtain a molded article, except that the amount added of the alumina having a primary particle diameter of 13 nm was changed to 1.5 parts by weight, 2.0 parts by weight, or 3 parts by weight. The evaluation results of the thermoplastic elastomer composition powder and the molded article are shown in Table 3.

COMPARATIVE EXAMPLE 1

The same operation as in Example 1 was carried out to obtain a thermoplastic elastomer composition powder and obtain a molded article, except that the alumina having a primary particle diameter of 13 nm was not blended. The evaluation results of the thermoplastic elastomer composition powder and the molded article are shown in Table 4.

COMPARATIVE EXAMPLES 2 TO 4

The same operation as in Example 1 was carried out to obtain a thermoplastic elastomer composition powder and obtain a molded article, except that alumina (AK-20 manufactured by Sumitomo Chemical Co., Ltd., α-alumina, primary particle diameter of 500 nm), alumina (AK-12 manufactured by Sumitomo Chemical Co., Ltd., α-alumina, primary particle diameter of 800 nm), or alumina (AK-10 manufactured by Sumitomo Chemical Co., Ltd., α-alumina, primary particle diameter of 1000 nm) were used in place of the alumina having a primary particle diameter of 13 nm. The evaluation results of the thermoplastic elastomer composition powder and the molded article are shown in Table 4.

EXAMPLES 8 AND 9

The same operation as in Example 1 was carried out to obtain a thermoplastic elastomer composition powder and obtain a molded article, except that 1.0 part by weight or 2.0 parts by weight (namely, the amounts of fine powder added are 0.4 parts by weight and 0.8 parts by weight, respectively) of a black pigment (Black pigment manufactured by Sumika Color Co., Ltd.; 40 parts by weight of fine powder pigment having a primary particle diameter of 100 nm was supported on 60 parts by weight of calcium carbonate having a primary particle diameter of 1.8 μm) were used in place of the alumina having a primary particle diameter of 13 nm. The evaluation results of the thermoplastic elastomer composition powder and the molded article are shown in Table 5.

EXAMPLES 10

The same operation as in Example 1 was carried out to obtain a thermoplastic elastomer composition powder and obtain a molded article, except that 1.0 part by weight of alumina (Alumina C; manufactured by Degussa Co., γ-alumina, primary particle diameter of 13 nm) and 1.0 part by weight of a black pigment (Black pigment, PV-801 manufactured by Sumika Color Co., Ltd.; 40 parts by weight of fine powder pigment having a primary particle diameter of 95 nm was supported on 60 parts by weight of calcium carbonate having a primary particle diameter of 1800 nm) (namely, the amount of fine powder added is 0.4 parts by weight) were used in place of the alumina having a primary particle diameter of 13 nm. The evaluation results of the thermoplastic elastomer composition powder and the molded article are shown in Table 6.

EXAMPLES 11

The same operation as in Example 1 was carried out to obtain a thermoplastic elastomer composition powder and obtain a molded article, except that the amount of black pigment blended was 2.0 parts by weight (namely, the amount of fine powder added is 0.8 parts by weight) in Example 10. The evaluation results of the thermoplastic elastomer composition powder and the molded article are shown in Table 6.

EXAMPLES 12

The same operation as in Example 1 was carried out to obtain a thermoplastic elastomer composition powder and obtain a molded article, except that a brown pigment (manufactured by Sumika Color Co., Ltd.; 75 parts by weight of fine powder pigment having a primary particle diameter of 150 nm was supported on 25 parts by weight of calcium carbonate having a primary particle diameter of 1800 nm. Namely, the amount of fine powder added is 0.75 parts by weight) was used in Example 10. The evaluation results of the thermoplastic elastomer composition powder and the molded article are shown in Table 6.

EXAMPLES 13 AND 14

The same operation as in Example 1 was carried out to obtain a thermoplastic elastomer composition powder and obtain a molded article, except that 1.0 part by weight of silica having a primary particle diameter of 40 nm (OX50 manufactured by Degussa Co.) and 1.0 part by weight of a black pigment (Black pigment manufactured by Sumika Color Co., Ltd.; 40 parts by weight of fine powder pigment having a primary particle diameter of 100 nm was supported on 60 parts by weight of calcium carbonate having a primary particle diameter of 1800 nm) (namely, the amount of fine powder added is 0.4 parts by weight), 1.0 part by weight of alumina (AKP-G008 manufactured by Sumitomo Chemical Co., Ltd., α-alumina, primary particle diameter of 100 nm) and a black pigment (Black pigment manufactured by Sumika Color Co., Ltd.; 40 parts by weight of fine powder pigment having a primary particle diameter of 100 nm was supported on 60 parts by weight of calcium carbonate having a primary particle diameter of 1800 nm) were used in place of the alumina having a primary particle diameter of 13 nm. The evaluation results of the thermoplastic elastomer composition powder and the molded article are shown in Table 6.

COMPARATIVE EXAMPLE 5

An oil-extended EPDM rubber (ESPRENE E670F (trademark) manufactured by Sumitomo Chemical Co., Ltd., $ML_{1+4}$ (100° C.)=53) was obtained by adding 25 parts by weight of a mineral oil-based softener [DIANAPROCESS PW-380 (trademark) manufactured by Idemitsu Kosan Co.] to 25 parts by weight of EPDM [$ML_{1+4}$ (100° C.)=242, content of propylene unit=28% by weight, iodine value=12]. Then, 50 parts by weight of a propylene-ethylene random copolymer resin (content of ethylene unit=5% by weight, MFR=90 g/10 min.) and 0.6 parts by weight of a crosslinking aid [SUMIFINE BM (trademark) manufactured by Sumitomo Chemical Co., Ltd., bismaleimide compound] were added thereto, and the mixture was kneaded using a Banbury mixer for 10 minutes to obtain a master batch for crosslinking (hereinafter, referred to as M.B.). The M.B. was pelletized using an extruder and a cutter. To 100 parts by weight of the pellet of the M.B., 0.4 part by weight of an organic peroxide [SUNPEROX APO (trademark) manufactured by Sanken Kako Co., Ltd., 2,3-dimethly-2,5-di(t-butylperoxyno)hexane] was added and kneaded in a biaxial extruder at a shear rate of $1.2\times10^3$ $sec^{-1}$ and 200° C. to effect dynamic crosslinking to obtain a thermoplastic elastomer. Then, the thermoplastic elastomer was extruded from the biaxial extruder and cut in pellet shape using the cutter. The complex dynamic viscosity $\eta^*(1)$ of the thermoplastic elastomer was $1.5\times10^3$ poise, and its Newtonian viscosity index n was 0.25.

Further, the obtained thermoplastic elastomer has two tan δ peaks, and no new single peak at a temperature different from that of both peaks appeared. The peak temperatures of respective tan δ peaks were −7° C. (intensity=0.12) and −45° C.(intensity=0.10).

After cooling the granules to −120° C. using liquid nitrogen, they were pulverized while being kept under cooling conditions, and a pulverized product of thermoplastic elastomer composition [which passed a Tyler standard sieve 32 mesh (opening=500 μm×500 μm) was obtained.

The same operation as in Example 1 was carried out to obtain a thermoplastic elastomer composition powder and a molded article, except that the pulverized product was used. The evaluation results of the thermoplastic elastomer composition powder and the molded article are shown in Table 7.

EXAMPLE 15

The same operation as in Example 1 was carried out to obtain a thermoplastic elastomer composition powder and obtain a molded article, except that 1.0 part by weight of silica having a primary particle diameter of 40 nm (OX50 manufactured by Degussa AG.), and 2.0 parts by weight of alumina silica having a primary particle diameter of 3.0 μm (grade JC-30 manufactured by Mizusawa Chemical Co.) were used in place of the alumina having a primary particle diameter of 13 nm. The evaluation results of the thermoplastic elastomer composition powder and the molded article are shown in Table 8.

TABLE 2

| | Example | | | |
|---|---|---|---|---|
| | 1 | 2 | 3 | 4 |
| (c) Fine powder | Alumina | Silica | Silica | Alumina |
| Primary particle diameter (nm) | 13 | 7 | 40 | 200 |
| Amount added (parts by weight) (per 100 parts by weight of pulverized product of thermoplastic elastomer composition) | 1.0 | 1.0 | 1.0 | 1.0 |
| Bulk specific gravity (g/cc) | 0.303 | 0.317 | 0.310 | 0.286 |
| Powder flowability (sec./100 ml) | 17.8 | 15.3 | 14.0 | 21.1 |
| Evaluation of molded article | 4 | 4 | 4 | 3 |
| Whitening on bending | | | | |
| 500 g | 4 | 4 | 4 | 4 |
| 1000 g | 4 | 4 | 4 | 4 |

TABLE 3

| | Example | | |
|---|---|---|---|
| | 5 | 6 | 7 |
| (c) Fine powder | Alumina | Alumina | Alumina |
| Primary particle diameter (nm) | 13 | 13 | 13 |
| Amount added (parts by weight) (per 100 parts by weight of pulverized product of thermoplastic elastomer composition) | 1.5 | 2.0 | 3.0 |
| Bulk specific gravity (g/cc) | 0.319 | 0.345 | 0.358 |
| Powder flowability (sec./100 ml) | 15.4 | 13.2 | 14.2 |
| Evaluation of molded article | 4 | 4 | 3 |
| Whitening on bending | | | |
| 500 g | 4 | 4 | 4 |
| 1000 g | 4 | 4 | 4 |

TABLE 4

| | Comparative Example | | | |
|---|---|---|---|---|
| | 1* | 2** | 3** | 4** |
| (c) Fine powder | — | Alumina | Silica | Alumina |
| Primary particle diameter (nm) | — | 500 | 800 | 1000 |
| Amount added (parts by weight) (per 100 parts by weight of pulverized product of thermoplastic elastomer composition) | — | 1.0 | 0.0 | 1.0 |
| Bulk specific gravity (g/cc) | Unmeasurable | 0.295 1. | 0.293 | 0.294 |
| Powder flowability (sec./100 ml) | Unmeasurable | Unmeasurable | Unmeasurable | Unmeasurable |
| Evaluation of molded article | 1 | 2 | 2 | 1 |
| Whitening on bending | | | | |
| 500 g | 4 | 4 | 4 | 4 |
| 1000 g | 4 | 4 | 4 | 4 |

*Comparative Example 1: The powder flowability of the thermoplastic elastomer composition powder was remarkably deteriorated, and bulk specific gravity and powder flowability could not be measured. The powder did not drop even if the slit of an apparatus described in JIS K-6721 was prickled with a wire.
**Comparative Examples 2 and 3: The powder flowability of the thermoplastic elastomer composition powder was remarkably deteriorated, and powder flowability could not be measured in good reproducibility. However, when the slit of an apparatus described in JIS K-6721 was prickled with a wire, the powder dropped, therefore the measurement of bulk specific gravity could be carried out.

TABLE 5

| | Example | |
|---|---|---|
| | 8 | 9 |
| (c) Fine powder | Black pigment | Black pigment |
| Primary particle diameter (nm) | 100 | 100 |
| Amount added (parts by weight) (per 100 parts by weight of pulverized product of thermoplastic elastomer composition) | 0.4 | 0.8 |
| (f) Powder | Calcium carbonate | Calcium carbonate |
| Primary particle diameter (μm) | 1.8 | 0.8 |
| Amount added (parts by weight) (per 100 parts by weight of pulverized product of thermoplastic elastomer composition) | 0.6 | 1.6 |
| Bulk specific gravity (g/cc) | 0.333 | 0.330 |
| Powder flowability (sec./100 ml) | 12.4 | 14.5 |
| Evaluation of molded article | 3 | 4 |
| Whitening on bending | | |
| 500 g | 4 | 4 |
| 1000 g | 4 | 4 |

TABLE 6

| | Example | | | | |
|---|---|---|---|---|---|
| | 10 | 11 | 12 | 13 | 14 |
| (c) Fine powder | Alumina | Alumina | Alumina | Silica | Alumina |
| Primary particle diameter (nm) | 13 | 13 | 13 | 40 | 100 |
| Amount added (parts by weight) (per 100 parts by weight of (a) propylene-ethylene copolymer resin) | 1.0 | 1.0 | 1.0 | 1.0 | 1.0 |
| (c) Fine powder | Black pigment | Black pigment | Brown pigment | Black pigment | Black pigment |
| Primary particle diameter (nm) | 95 | 95 | 150 | 100 | 100 |
| Amount added (parts by weight) (per 100 parts by weight of pulverized product of thermoplastic elastomer composition) | 0.4 | 0.8 | 0.75 | 0.4 | 0.4 |
| (f) Powder | Calcium carbonate | Calcium carbonate | Calcium carbonate | Calcium carbonate | Calcium carbonate |
| Primary particle diameter (μm) | 1.8 | 1.8 | 1.8 | 1.8 | 1.8 |
| Amount added (parts by weight) (per 100 parts by weight of pulverized product of thermoplastic elastomer composition) | 0.6 | 0.6 | 0.25 | 0.6 | 0.6 |
| Bulk specific gravity (g/cc) | 0.338 | 0.368 | 0.358 | 0.354 | 0.346 |
| Powder flowability (sec./100 ml) | 13.4 | 14.3 | 13.8 | 14.6 | 13.6 |
| Evaluation of molded article | 4 | 4 | 4 | 4 | 4 |
| Whitening on bending | | | | | |
| 500 g | 4 | 4 | 4 | 4 | 4 |
| 1000 g | 4 | 4 | 4 | 4 | 4 |

TABLE 7

| | Comparative Example 5 |
|---|---|
| (c) Fine powder | Alumina |
| Primary particle diameter (nm) | 13 |
| Amount added (parts by weight) (per 100 parts by weight of pulverized product of thermoplastic elastomer composition) | 1.0 |
| Bulk specific gravity (g/cc) | 0.314 |
| Powder flowability (sec./100 ml) | 15.6 |
| Evaluation of molded article | 4 |
| Whitening on bending | |
| 500 g | 2 |
| 1000 g | 2 |

TABLE 8

| | Example 15 |
|---|---|
| (c) Fine powder | Silica |
| Primary particle diameter (nm) | 40 |
| Amount added (parts by weight) (per 100 parts by weight of pulverized product of thermoplastic elastomer composition) | 1.0 |
| (f) Powder | 3 |
| Primary particle diameter (μm) | 2.0 |
| Amount added (parts by weight) (per 100 parts by weight of pulverized product of thermoplastic elastomer composition) | |
| Bulk specific gravity (g/cc) | 0.390 |
| Powder flowability (sec./100 ml) | 16.2 |
| Evaluation of molded article | 4 |
| Whitening on bending | |
| 500 g | 4 |
| 1000 g | 4 |

EXAMPLE 16

[Production of thermoplastic elastomer composition powder]

The same operation as [Production of thermoplastic elastomer composition powder] in Example 1 was carried out to produce a powder, except that 2.5 parts by weight (namely, the net amount of black pigment added is 1.0 part by weight) of a black pigment supported product (manufactured by Sumika Color Co., Ltd.; 40 parts by weight of fine powder pigment having a primary particle diameter of 100 nm was supported on 60 parts by weight of calcium carbonate having a primary particle diameter of 1800 nm) per 100 parts by weight of a propyleneethylene copolymer resin was added and kneaded. The same operation as in Example 1 was carried out except using it to produce a molded article by powder slush molding method. The evaluation results of the thermoplastic elastomer composition powder and the molded article are shown in Table 9.

EXAMPLE 17

The same operation as in Example 16 was carried out to obtain a thermoplastic elastomer composition powder and obtain a molded article, except that silica (OX50 manufactured by Degussa Co., primary particle diameter of 40 nm) was used in place of the alumina having a primary particle diameter of 13 nm. The evaluation results of the thermoplastic elastomer composition powder and the molded article are shown in Table 9.

EXAMPLES 18 AND 19

The same operation as in Example 16 was carried out to obtain a thermoplastic elastomer composition powder and obtain a molded article, except that the amount added of the alumina having a primary particle diameter of 13 nm was changed to 1.5 parts by weight or 2.0 parts by weight. The evaluation results of the thermoplastic elastomer composition powder and the molded article are shown in Table 9.

EXAMPLE 20

The same operation as in Example 16 was carried out to obtain a thermoplastic elastomer composition powder and obtain a molded article, except that the amount added of alumina having a primary particle diameter of 40 nm was changed to 0.7 parts by weight. The evaluation results of the thermoplastic elastomer composition powder and the molded article are shown in Table 9.

EXAMPLE 21

The same operation as in Example 16 was carried out to obtain a thermoplastic elastomer composition powder and obtain a molded article, except that 1.0 part by weight of a brown pigment (fine powder pigment manufactured by Sumika Color Co., Ltd.) was added in place of the black pigment supported product. The evaluation results of the thermoplastic elastomer composition powder and the molded article are shown in Table 10.

COMPARATIVE EXAMPLE 6

The same operation as in Example 16 was carried out to obtain a thermoplastic elastomer composition powder and obtain a molded article, except that the alumina having a primary particle diameter of 13 nm was not blended. The evaluation results of the thermoplastic elastomer composition powder and the molded article are shown in Table 11.

COMPARATIVE EXAMPLE 7

An oil-extended EPDM rubber [ESPRENE E670F (trademark) manufactured by Sumitomo Chemical Co., Ltd., $ML_{1+4}$ (100° C.)=53] was obtained by adding 25 parts by weight of a mineral oil-based softener [DIANAPROCESS PW-380 (trademark) manufactured by Idemitsu Kosan Co.] to 25 parts by weight of an EPDM [$ML_{1+4}$ (100° C.)=242, content of propylene unit=28% by weight, iodine value=12]. Then, 50 parts by weight of a propylene-ethylene random copolymer resin (content of ethylene unit=5% by weight, MFR=90 g/10 min.), 0.6 parts by weight of a crosslinking aid [SUMIFINE BM (trademark) manufactured by Sumitomo Chemical Co., Ltd., bismaleimide compound], and 1.0 part by weight (namely, the net amount of black pigment added is 0.4 parts by weight) of a black pigment supported product (manufactured by Sumika Color Co., Ltd.; 40 parts by weight of fine powder pigment having a primary particle diameter of 100 nm was supported on 60 parts by weight of calcium carbonate having a primary particle diameter of 1800 nm) were added thereto, and the mixture was kneaded using a Banbury mixer for 10 minutes to obtain a master batch for crosslinking (hereinafter, referred to as M.B.). The M.B. was pelletized using an extruder and a cutter.

To 100 parts by weight of the M.B., 0.4 parts by weight of an organic peroxide [SUNPEROX APO (trademark)

manufactured by Sanken Kako Co., Ltd., 2,3-dimethyl-2,5-di(t-butylperoxyno)hexane] was added and kneaded using a biaxial extruder at a shear rate of $1.2\times10^3$ $sec^{-1}$ and 200° C. to effect dynamic crosslinking to obtain a thermoplastic elastomer. Then, the thermoplastic elastomer was extruded from the biaxial extruder and cut in pellet shape using the cutter.

The complex dynamic viscosity $\eta^*(1)$ of the thermoplastic elastomer was $1.5\times10^3$ poise, and its Newtonian viscosity index n was 0.25.

Further, the thermoplastic elastomer obtained has two tan δ peaks, and no new single peak at a temperature different from that of both peaks appeared. The peak temperatures of respective tan δ peaks were −7° C. (intensity=0.12) and −45° C.(intensity=0.10).

After cooling the granules to −120° C. using liquid nitrogen, they were pulverized while being kept under cooling conditions, and a pulverized product of thermoplastic elastomer composition [which passed a Tyler standard sieve 32 mesh (opening=500 μm×500 μm)] was obtained.

The same operation as in Example 16 was carried out to obtain a thermoplastic elastomer composition powder and obtain a molded article, except that this pulverized product was used. The evaluation results of the thermoplastic elastomer composition powder and the molded article are shown in Table 11.

EXAMPLE 22

The same operation as in Example 16 was carried out to obtain a thermoplastic elastomer composition powder and obtain a molded article, except that 1.0 part by weight of silica having a primary particle diameter of 40 nm (OX50 manufactured by Degussa AG.), and 2.0 parts by weight of alumina silica having a primary particle diameter of 3.0 μm (grade JC-30 manufactured by Mizusawa Chemical Co.) were used in combination in place of the alumina having a primary particle diameter of 13 nm. The evaluation results of the thermoplastic elastomer composition powder and the molded article are shown in Table 12.

TABLE 9

| | Example | | | | |
|---|---|---|---|---|---|
| | 16 | 17 | 18 | 19 | 20 |
| (d) Pigment | | | | | |
| Color | Black | Black | Black | Black | Black |
| Substantial amount added (parts by weight) (per 100 parts by weight of (a) propylene-ethylene copolymer resin) | 1.0 | 1.0 | 1.0 | 1.0 | 1.0 |
| (c) Fine powder | Alumina | Silica | Alumina | Alumina | Silica |
| Primary particle diameter (nm) | 13 | 40 | 13 | 13 | 40 |
| Amount added (parts by weight) (per 100 parts by weight of pulverized product of thermoplastic elastomer composition) | 1.0 | 1.0 | 1.5 | 2.0 | 0.7 |
| Bulk specific gravity (g/cc) | 0.345 | 0.369 | 0.366 | 0.370 | 0.354 |
| Powder flowability (sec./100 ml) | 16.2 | 16.1 | 15.9 | 17.4 | 14.6 |
| Evaluation of molded article | 4 | 4 | 4 | 4 | 4 |
| Whitening on bending | | | | | |
| 500 g | 4 | 4 | 4 | 4 | 4 |
| 1000 g | 4 | 4 | 4 | 4 | 4 |
| Solvent resistance | 4 | 4 | 4 | 4 | 4 |

TABLE 10

| | Example 21 |
|---|---|
| (d) Pigment Color | Brown |
| Amount added (parts by weight) (per 100 parts by weight of (a) propylene-ethylene copolymer resin) | 1.0 |
| (c) Fine powder | Alumina |
| Primary particle diameter (nm) | 13 |
| Amount added (parts by weight) (per 100 parts by weight of pulverized product of thermoplastic elastomer composition) | 1.0 |
| Bulk specific gravity (g/cc) | 0.345 |
| Powder flowability (sec./100 ml) | 16.2 |
| Evaluation of molded article | 4 |
| Whitening on bending | |
| 500 g | 4 |
| 1000 g | 4 |
| Solvent resistance | 4 |

TABLE 11

| | Comparative Example | |
|---|---|---|
| | 6 | 7 |
| (d) Pigment Color | Black | Black |
| Substantial amount added (parts by weight) (per 100 parts by weight of (a) propylene-ethylene copolymer resin) | 1.0 | 0.8 |
| (c) Fine powder | — | Alumina |
| Primary particle diameter (nm) | — | 13 |
| Amount added (parts by weight) (per 100 parts by weight of pulverized product of thermoplastic elastomer composition) | — | 1.0 |
| Bulk specific gravity (g/cc) | 0.304 | 0.358 |
| Powder flowability (sec./100 ml) | 17.5 | 14.2 |
| Evaluation of molded article | 2 | 4 |
| Whitening on bending | | |
| 500 g | 4 | 2 |
| 1000 g | 4 | 2 |
| Solvent resistance | 4 | 3 |

TABLE 12

| | Example 22 |
|---|---|
| (d) Pigment | |
| Color | Black |
| Substantial amount added (parts by weight) (per 100 parts by weight of (a) propylene-ethylene copolymer resin) | 1.0 |
| (c) Fine powder | Silica |
| Primary particle diameter (nm) | 40 |
| Amount added (parts by weight) (per 100 parts by weight of pulverized product of thermoplastic elastomer composition) | 1.0 |

TABLE 12-continued

| | Example 22 |
|---|---|
| (f) Powder | Alumina-silica |
| Primary particle diameter (μm) | 3 |
| Amount added (parts by weight) (per 100 parts by weight of pulverized product of thermoplastic elastomer composition) | 2.0 |
| Bulk specific gravity (g/cc) | 0.395 |
| Powder flowability (sec./100 ml) | 16.2 |
| Evaluation of molded article | 4 |
| Whitening on bending | |
| 500 g | 4 |
| 1000 g | 4 |
| Solvent resistance | 4 |

INDUSTRIAL APPLICABILITY

As illustrated above, according to the present invention, a thermoplastic elastomer composition powder blending a specified amount of fine powder with a pulverized product of a thermoplastic elastomer composition which contains a polyolefin-based resin and a rubbery polymer as essential components, and being capable of producing a complicated shape molded article which is excellent in powder flow property and giving a molded article which is hardly whitened even though being bent; a powder molding process using said powder; and a molded article obtained by using said powder can be provided.

What is claimed is:

1. A thermoplastic elastomer composition powder obtained by blending a pulverized product of a thermoplastic elastomer composition comprising 100 parts by weight of (a) and 10 to 250 parts by weight of (b) described below, and having a complex dynamic viscosity $\eta^*$ (1) of $1.5\times10^5$ poise or less and a Newtonian viscosity index n of 0.67 or less, with 0.1 to 5 parts by weight of (c) and 0.1 to 5 parts by weight of (f) described below per 100 parts by weight of the pulverized product:

(a): a polyolefin-based resin, (b): a rubbery polymer imparting a new single tan δ peak at a temperature different from that of the tan δ peak of (a) and that of the tan δ peak of (b) within the range of −70 to 30° C. in a temperature dependence curve of tan δ determined by solid viscoelasticity measurement of the composition obtained by kneading with (a), selected from the group consisting of a conjugated diene-based rubbery polymer and a hydrogenated product thereof, and a propylene-butene-based copolymer having a Shore A hardness measured according to ASTM D-2240 of 70 or less and an intrinsic viscosity [η]measured at 70° C. in xylene solvent of 0.3 dl/g or more, (c) a fine powder having a primary particle size of 5 to 150 nm, and (f) a powder having a primary particle diameter of more than 300 nm and not more than 10 μm.

2. A thermoplastic elastomer composition powder according to claim 1, wherein the thermoplastic elastomer composition further contains 0.01 to 10 parts by weight of a pigment (d) per 100 parts by weight of the polyolefin-based resin (a).

3. A thermoplastic elastomer composition powder according to claim 1 or 2, wherein the thermoplastic elastomer composition further contains 250 parts by weight or less of (e) described below per 100 parts by weight of the polyolefin-based resin (a), and is a pulverized product of a thermoplastic elastomer composition having a complex dynamic viscosity $\eta^*$ (1) of $1.5\times10^5$ poise or less and a Newtonian viscosity index n of 0.67 or less;

(e): an ethylene-α-olefin-based copolymer having an α-olefin unit content of less than 50% by weight.

4. A thermoplastic elastomer composition powder according to claim 1, wherein the conjugated diene-based rubbery polymer is a copolymer of a conjugated diene with other monomer.

5. A thermoplastic elastomer composition powder according to claim 4, wherein the other monomer is a vinyl aromatic compound, a vinyl ester compound, an ethylenically unsaturated carboxylic acid ester compound or a vinyl nitrile compound.

6. A thermoplastic elastomer composition powder according to claim 1 or 2, wherein the rubbery polymer (b) is a propylene-α-olefin-ethylene-based copolymer having a Shore A hardness measured according to ASTM D-2240 of 70 or less and an intrinsic viscosity [η] measured at 70° C. in xylene solvent of 0.3 dl/g or more and containing proplylene units, α-olefins units having 4 to 20 carbon atoms and ethylene units.

7. A thermoplastic elastomer composition powder according to claim 1 or 2, wherein 0.1 to 5 parts by weight of (f) is blended per 100 parts by weight of the pulverized product of the thermoplastic elastomer.

8. A thermoplastic elastomer composition powder according to claim 1, wherein the fine powder (c) having a primary particle size of 5 to 150 nm is a pigment, alumina, silica or alumina silica.

9. A thermoplastic elastomer composition powder according to claim 10, wherein the powder (f) having a primary particle diameter of more than 300 nm and not more than 10 μm is alumina, silica, alumina silica or calcium carbonate.

10. A powder molding method using the thermoplastic elastomer composition powder according to claim 1 or 2.

11. A powder molding method according to claim 10, wherein said thermoplastic elastomer composition powder is powder molded after coating a fluorine-based and/or silicone-based mold releasing agent on the molding surface of a mold.

12. A powder molding method according to claim 11 comprising the steps described below;

the first step: a step of coating a fluorine-based and/or silicone-based mold releasing agent on the molding surface of a mold, the second step: a step of feeding the thermoplastic elastomer composition powder on the molding surface of a mold heated to a melting temperature of the thermoplastic elastomer composition powder or higher, the third step: a step of heating the thermoplastic elastomer composition powder on the molding surface of the second step for a predetermined time, and mutually fusing the powder whose surface is at least melted, the fourth step: a step of recovering the non-fused powder after a lapse of the predetermined time in the third process, the fifth step: a step of additionally heating the mold on which the thermoplastic elastomer composition powder melted is mounted, according to requirement, and the sixth step: a step of cooling the mold after the fifth step and removing a molded article formed thereon from the mold.

13. A molded article obtained by powder molding the thermoplastic elastomer composition powder according to claim 1.

14. A two-layer molded article wherein a foamed layer is laminated on one face side of the molded article according to claim 13.

15. A multi-layer molded article wherein a thermoplastic resin core material is laminated on one face side of the molded article according to claim 13.

16. A multi-layer molded article wherein the thermoplastic resin core material is laminated on a foamed layer side of the two-layer molded article according to claim 14.

17. A process for producing a multi-layer molded article in which a thermoplastic resin core material is laminated on one face side of the molded article of claim 13, which comprises feeding a molten thermoplastic resin on one face side of the molded article and pressurizing.

18. A process for producing a multi-layer molded article in which a thermoplastic resin core material is laminated on a foamed layer side of the two-layer molded article of claim 14, which comprises feeding a molten thermoplastic resin on a foamed layer side of the two-layer molded article and pressurizing.

19. The process for producing according to claim 17, wherein the molded article is fed between a pair of mold members freely mobilized, and then both mold members is closed after feeding or while feeding the molten thermoplastic resin between the one face side of said molded article and the one side of the mold facing with the molded article.

20. The process for producing according to claim 18, wherein the two-layer molded article is fed between a pair of mold members freely mobilized, and then both mold members are closed after feeding or while feeding the molten thermoplastic resin between the one face side of said molded article and the one side of the mold facing with the molded article.

* * * * *